US010313337B2

(12) United States Patent
Ahuja et al.

(10) Patent No.: US 10,313,337 B2
(45) Date of Patent: *Jun. 4, 2019

(54) SYSTEM AND METHOD FOR PROTECTING SPECIFIED DATA COMBINATIONS

(71) Applicant: McAfee, LLC, Santa Clara, CA (US)

(72) Inventors: Ratinder Paul Singh Ahuja, Saratoga, CA (US); William J. Deninger, San Mateo, CA (US)

(73) Assignee: McAfee, LLC, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/700,826

(22) Filed: Sep. 11, 2017

(65) Prior Publication Data

US 2017/0374064 A1 Dec. 28, 2017

Related U.S. Application Data

(63) Continuation of application No. 14/457,038, filed on Aug. 11, 2014, now Pat. No. 9,794,254, which is a
(Continued)

(51) Int. Cl.
*G06F 7/04* (2006.01)
*H04L 29/06* (2006.01)
*G06F 15/16* (2006.01)

(52) U.S. Cl.
CPC ...... *H04L 63/0853* (2013.01); *H04L 63/1416* (2013.01)

(58) Field of Classification Search
CPC ............ H04L 63/0853; H04L 63/1416; H04L 63/20; G06F 17/30011; G06F 17/30713
(Continued)

(56) References Cited

U.S. PATENT DOCUMENTS

| 4,286,255 A | 8/1981 | Siy |
| 4,710,957 A | 12/1987 | Bocci et al. |

(Continued)

FOREIGN PATENT DOCUMENTS

| CN | 01192237 | 6/2008 |
| EP | 2499806 | 9/2012 |

(Continued)

OTHER PUBLICATIONS

U.S. Appl. No. 13/168,739, now issued as U.S. Pat. No. 8,762,386.
(Continued)

*Primary Examiner* — Gary S Gracia
(74) *Attorney, Agent, or Firm* — Patent Capital Group

(57) ABSTRACT

A method in one example implementation includes extracting a plurality of data elements from a record of a data file, tokenizing the data elements into tokens, and storing the tokens in a first tuple of a registration list. The method further includes selecting one of the tokens as a token key for the first tuple, where the token is selected because it occurs less frequently in the registration list than each of the other tokens in the first tuple. In specific embodiments, at least one data element is an expression element having a character pattern matching a predefined expression pattern that represents at least two words and a separator between the words. In other embodiments, at least one data element is a word defined by a character pattern of one or more consecutive essential characters. Other specific embodiments include determining an end of the record by recognizing a predefined delimiter.

20 Claims, 13 Drawing Sheets

Related U.S. Application Data continuation of application No. 12/939,340, filed on Nov. 4, 2010, now Pat. No. 8,806,615.

(58) Field of Classification Search
USPC ......... 380/44; 726/9, 20; 707/741, 625, 665, 707/668, 694
See application file for complete search history.

(56) References Cited

U.S. PATENT DOCUMENTS

| | | | |
|---|---|---|---|
| 5,249,289 A | 9/1993 | Thamm et al. |
| 5,465,299 A | 11/1995 | Matsumoto et al. |
| 5,479,654 A | 12/1995 | Squibb |
| 5,497,489 A | 3/1996 | Menne |
| 5,542,090 A | 7/1996 | Henderson et al. |
| 5,557,747 A | 9/1996 | Rogers et al. |
| 5,577,249 A * | 11/1996 | Califano ........... G06F 17/30985 382/209 |
| 5,623,652 A | 4/1997 | Vora et al. |
| 5,768,578 A | 6/1998 | Kirk |
| 5,781,629 A | 7/1998 | Haber et al. |
| 5,787,232 A | 7/1998 | Greiner et al. |
| 5,794,052 A | 8/1998 | Harding |
| 5,813,009 A | 9/1998 | Johnson et al. |
| 5,873,081 A | 2/1999 | Harel |
| 5,924,096 A | 7/1999 | Draper et al. |
| 5,937,422 A | 8/1999 | Nelson et al. |
| 5,943,670 A | 8/1999 | Prager |
| 5,987,610 A | 11/1999 | Franczek et al. |
| 5,995,111 A | 11/1999 | Morioka et al. |
| 6,026,411 A | 2/2000 | Delp |
| 6,073,142 A | 6/2000 | Geiger et al. |
| 6,078,953 A | 6/2000 | Vaid et al. |
| 6,094,531 A | 7/2000 | Allison et al. |
| 6,108,697 A | 8/2000 | Raymond et al. |
| 6,122,379 A | 9/2000 | Barbir |
| 6,161,102 A | 12/2000 | Yanagihara et al. |
| 6,175,867 B1 | 1/2001 | Taghadoss |
| 6,192,472 B1 | 2/2001 | Garay et al. |
| 6,243,091 B1 | 6/2001 | Berstis |
| 6,243,720 B1 | 6/2001 | Munter et al. |
| 6,278,992 B1 | 8/2001 | Curtis et al. |
| 6,292,810 B1 | 9/2001 | Richards |
| 6,336,186 B1 | 1/2002 | Dyksterhouse et al. |
| 6,343,376 B1 | 1/2002 | Saxe et al. |
| 6,356,885 B2 | 3/2002 | Ross et al. |
| 6,363,488 B1 | 3/2002 | Ginter et al. |
| 6,389,405 B1 | 5/2002 | Oatman et al. |
| 6,389,419 B1 | 5/2002 | Wong et al. |
| 6,408,294 B1 | 6/2002 | Getchius et al. |
| 6,408,301 B1 | 6/2002 | Patton et al. |
| 6,411,952 B1 * | 6/2002 | Bharat ............... G06F 17/30864 |
| 6,457,017 B2 | 9/2002 | Watkins et al. |
| 6,460,050 B1 | 10/2002 | Pace et al. |
| 6,493,761 B1 | 12/2002 | Baker et al. |
| 6,499,105 B1 | 12/2002 | Yoshiura et al. |
| 6,502,091 B1 | 12/2002 | Chundi et al. |
| 6,515,681 B1 | 2/2003 | Knight |
| 6,516,320 B1 | 2/2003 | Odom et al. |
| 6,523,026 B1 | 2/2003 | Gillis |
| 6,539,024 B1 | 3/2003 | Janoska et al. |
| 6,556,964 B2 | 4/2003 | Haug et al. |
| 6,556,983 B1 | 4/2003 | Altschuler et al. |
| 6,571,275 B1 | 5/2003 | Dong et al. |
| 6,584,458 B1 | 6/2003 | Millett et al. |
| 6,598,033 B2 | 7/2003 | Ross et al. |
| 6,629,097 B1 | 9/2003 | Keith |
| 6,662,176 B2 | 12/2003 | Brunet et al. |
| 6,665,662 B1 | 12/2003 | Kirkwood et al. |
| 6,675,159 B1 | 1/2004 | Lin et al. |
| 6,691,209 B1 | 2/2004 | O'Connell |
| 6,754,647 B1 | 6/2004 | Tackett et al. |
| 6,757,646 B2 | 6/2004 | Marchisio |
| 6,771,595 B1 | 8/2004 | Gilbert et al. |
| 6,772,214 B1 | 8/2004 | McClain et al. |
| 6,785,815 B1 | 8/2004 | Serret-Avila et al. |
| 6,804,627 B1 | 10/2004 | Marokhovsky et al. |
| 6,820,082 B1 | 11/2004 | Cook et al. |
| 6,857,011 B2 | 2/2005 | Reinke |
| 6,937,257 B1 | 8/2005 | Dunlavey |
| 6,950,864 B1 | 9/2005 | Tsuchiya |
| 6,976,053 B1 | 12/2005 | Tripp et al. |
| 6,978,297 B1 | 12/2005 | Piersol |
| 6,978,367 B1 | 12/2005 | Hind et al. |
| 7,007,020 B1 | 2/2006 | Chen et al. |
| 7,020,654 B1 | 3/2006 | Najmi |
| 7,020,661 B1 | 3/2006 | Cruanes et al. |
| 7,062,572 B1 | 6/2006 | Hampton |
| 7,062,705 B1 | 6/2006 | Kirkwood et al. |
| 7,072,967 B1 | 7/2006 | Saulpaugh et al. |
| 7,082,443 B1 | 7/2006 | Ashby |
| 7,093,288 B1 | 8/2006 | Hydrie et al. |
| 7,103,607 B1 | 9/2006 | Kirkwood et al. |
| 7,130,587 B2 | 10/2006 | Hikokubo et al. |
| 7,133,400 B1 | 11/2006 | Henderson et al. |
| 7,139,973 B1 | 11/2006 | Kirkwood et al. |
| 7,143,109 B2 | 11/2006 | Nagral et al. |
| 7,158,983 B2 | 1/2007 | Willse et al. |
| 7,165,175 B1 | 1/2007 | Kollmyer et al. |
| 7,171,662 B1 | 1/2007 | Misra et al. |
| 7,181,769 B1 | 2/2007 | Keanini et al. |
| 7,185,073 B1 | 2/2007 | Gai et al. |
| 7,185,192 B1 | 2/2007 | Kahn |
| 7,188,173 B2 | 3/2007 | Anderson et al. |
| 7,194,483 B1 | 3/2007 | Mohan et al. |
| 7,219,131 B2 | 5/2007 | Banister et al. |
| 7,219,134 B2 | 5/2007 | Takeshima et al. |
| 7,243,120 B2 | 7/2007 | Massey |
| 7,246,236 B2 | 7/2007 | Stirbu |
| 7,254,562 B2 | 8/2007 | Hsu et al. |
| 7,254,632 B2 | 8/2007 | Zeira et al. |
| 7,266,845 B2 | 9/2007 | Hypponen |
| 7,272,724 B2 | 9/2007 | Tarbotton et al. |
| 7,277,957 B2 | 10/2007 | Rowley et al. |
| 7,290,048 B1 | 10/2007 | Barnett et al. |
| 7,293,067 B1 | 11/2007 | Maki et al. |
| 7,293,238 B1 | 11/2007 | Brook et al. |
| 7,296,011 B2 | 11/2007 | Chaudhuri et al. |
| 7,296,070 B2 | 11/2007 | Sweeney et al. |
| 7,296,088 B1 | 11/2007 | Padmanabhan et al. |
| 7,296,232 B1 | 11/2007 | Burdick et al. |
| 7,299,277 B1 | 11/2007 | Moran et al. |
| 7,299,489 B1 | 11/2007 | Branigan et al. |
| 7,373,500 B2 | 5/2008 | Ramelson et al. |
| 7,424,744 B1 | 9/2008 | Wu et al. |
| 7,426,181 B1 | 9/2008 | Feroz et al. |
| 7,434,058 B2 | 10/2008 | Ahuja et al. |
| 7,467,202 B2 | 12/2008 | Savchuk |
| 7,477,780 B2 | 1/2009 | Boncyk et al. |
| 7,483,916 B2 | 1/2009 | Lowe et al. |
| 7,493,659 B1 | 2/2009 | Wu et al. |
| 7,505,463 B2 | 3/2009 | Schuba et al. |
| 7,506,055 B2 | 3/2009 | McClain et al. |
| 7,506,155 B1 | 3/2009 | Stewart et al. |
| 7,509,677 B2 | 3/2009 | Saurabh et al. |
| 7,516,492 B1 | 4/2009 | Nisbet et al. |
| 7,539,683 B1 | 5/2009 | Satoh et al. |
| 7,551,629 B2 | 6/2009 | Chen et al. |
| 7,577,154 B1 | 8/2009 | Yung et al. |
| 7,581,059 B2 | 8/2009 | Gupta et al. |
| 7,596,571 B2 | 9/2009 | Sifry |
| 7,599,844 B2 | 10/2009 | King et al. |
| 7,657,104 B2 | 2/2010 | Deninger et al. |
| 7,664,083 B1 | 2/2010 | Cermak et al. |
| 7,685,254 B2 | 3/2010 | Pandya |
| 7,689,614 B2 | 3/2010 | de la Iglesia et al. |
| 7,730,011 B1 | 6/2010 | Deninger et al. |
| 7,739,080 B1 | 6/2010 | Beck et al. |
| 7,760,730 B2 | 7/2010 | Goldschmidt et al. |
| 7,760,769 B1 | 7/2010 | Lovett et al. |
| 7,774,604 B2 | 8/2010 | Lowe et al. |
| 7,783,589 B2 * | 8/2010 | Hornkvist ........ G06F 17/30657 |
| 7,801,852 B2 | 9/2010 | Wong et al. |
| 7,814,327 B2 | 10/2010 | Ahuja et al. |

(56) References Cited

U.S. PATENT DOCUMENTS

| | | | |
|---|---|---|---|
| 7,818,326 B2 | 10/2010 | Deninger et al. | |
| 7,844,582 B1 | 11/2010 | Arbilla et al. | |
| 7,849,065 B2 | 12/2010 | Kamani et al. | |
| 7,886,359 B2 | 2/2011 | Jones et al. | |
| 7,899,828 B2 | 3/2011 | de la Iglesia et al. | |
| 7,907,608 B2 | 3/2011 | Liu et al. | |
| 7,921,072 B2 | 4/2011 | Bohannon et al. | |
| 7,926,099 B1 | 4/2011 | Chakravarty et al. | |
| 7,930,540 B2 | 4/2011 | Ahuja et al. | |
| 7,949,849 B2 | 5/2011 | Lowe et al. | |
| 7,958,227 B2 | 6/2011 | Ahuja et al. | |
| 7,962,591 B2 | 6/2011 | Deninger et al. | |
| 7,979,524 B2 | 7/2011 | Dieberger et al. | |
| 7,984,175 B2 | 7/2011 | de la Iglesia et al. | |
| 7,996,373 B1 | 8/2011 | Zoppas et al. | |
| 8,005,863 B2 | 8/2011 | de la Iglesia et al. | |
| 8,010,689 B2 | 8/2011 | Deninger et al. | |
| 8,046,372 B1* | 10/2011 | Thirumalai | G06F 17/30616 707/749 |
| 8,055,601 B2 | 11/2011 | Pandya | |
| 8,056,130 B1 | 11/2011 | Njemanze et al. | |
| 8,065,739 B1 | 11/2011 | Bruening et al. | |
| 8,166,307 B2 | 4/2012 | Ahuja et al. | |
| 8,176,049 B2 | 5/2012 | Deninger et al. | |
| 8,200,026 B2 | 6/2012 | Deninger et al. | |
| 8,205,242 B2 | 6/2012 | Liu et al. | |
| 8,205,244 B2 | 6/2012 | Nightingale et al. | |
| 8,261,347 B2 | 9/2012 | Hrabik et al. | |
| 8,271,794 B2 | 9/2012 | Lowe et al. | |
| 8,286,253 B1 | 10/2012 | Lu et al. | |
| 8,301,635 B2 | 10/2012 | de la Iglesia et al. | |
| 8,307,007 B2 | 11/2012 | de la Iglesia et al. | |
| 8,307,206 B2 | 11/2012 | Ahuja et al. | |
| 8,341,734 B1 | 12/2012 | Hernacki et al. | |
| 8,396,844 B1* | 3/2013 | Balkany | G06F 17/30327 707/693 |
| 8,463,800 B2 | 6/2013 | Deninger et al. | |
| 8,473,442 B1 | 6/2013 | Deninger et al. | |
| 8,504,537 B2 | 8/2013 | de la Iglesia et al. | |
| 8,521,757 B1 | 8/2013 | Nanda et al. | |
| 8,560,534 B2 | 10/2013 | Lowe et al. | |
| 8,601,537 B2 | 12/2013 | Lu et al. | |
| 8,612,570 B1 | 12/2013 | Nair et al. | |
| 8,635,706 B2 | 1/2014 | Liu | |
| 8,645,397 B1* | 2/2014 | Koudas | G06F 17/30336 707/728 |
| 8,656,039 B2 | 2/2014 | de la Iglesia et al. | |
| 8,667,121 B2 | 3/2014 | Ahuja et al. | |
| 8,683,035 B2 | 3/2014 | Ahuja et al. | |
| 8,700,561 B2 | 4/2014 | Ahuja et al. | |
| 8,706,709 B2 | 4/2014 | Ahuja et al. | |
| 8,707,008 B2 | 4/2014 | Lowe et al. | |
| 8,730,955 B2 | 5/2014 | Liu et al. | |
| 8,762,386 B2 | 6/2014 | de la Iglesia et al. | |
| 8,806,615 B2 | 8/2014 | Ahuja et al. | |
| 8,825,665 B2* | 9/2014 | Harbarth | G06F 17/30911 707/742 |
| 8,850,591 B2 | 9/2014 | Ahuja et al. | |
| 8,918,359 B2 | 12/2014 | Ahuja et al. | |
| 9,092,471 B2 | 7/2015 | de la Iglesia et al. | |
| 9,094,338 B2 | 7/2015 | Ahuja et al. | |
| 9,195,937 B2 | 11/2015 | Deninger et al. | |
| 9,326,134 B2 | 4/2016 | Ahuja et al. | |
| 9,374,225 B2 | 6/2016 | Malhan et al. | |
| 9,430,564 B2 | 8/2016 | Ahuja et al. | |
| 2001/0010717 A1 | 8/2001 | Goto et al. | |
| 2001/0013024 A1 | 8/2001 | Takahashi et al. | |
| 2001/0032310 A1 | 10/2001 | Corella | |
| 2001/0037324 A1 | 11/2001 | Agrawal et al. | |
| 2001/0046230 A1 | 11/2001 | Rojas | |
| 2002/0032677 A1 | 3/2002 | Morgenthaler et al. | |
| 2002/0032772 A1 | 3/2002 | Olstad et al. | |
| 2002/0046221 A1 | 4/2002 | Wallace et al. | |
| 2002/0052896 A1 | 5/2002 | Streit et al. | |
| 2002/0065956 A1 | 5/2002 | Yagawa et al. | |
| 2002/0078355 A1 | 6/2002 | Samar | |
| 2002/0091579 A1 | 7/2002 | Yehia et al. | |
| 2002/0103799 A1* | 8/2002 | Bradford | G06F 17/30687 |
| 2002/0103876 A1 | 8/2002 | Chatani et al. | |
| 2002/0107843 A1 | 8/2002 | Biebesheimer et al. | |
| 2002/0116124 A1 | 8/2002 | Garin et al. | |
| 2002/0116721 A1 | 8/2002 | Dobes et al. | |
| 2002/0126673 A1 | 9/2002 | Dagli et al. | |
| 2002/0128903 A1 | 9/2002 | Kernahan | |
| 2002/0129140 A1 | 9/2002 | Peled et al. | |
| 2002/0159447 A1 | 10/2002 | Carey et al. | |
| 2003/0009718 A1 | 1/2003 | Wolfgang et al. | |
| 2003/0028493 A1 | 2/2003 | Tajima | |
| 2003/0028774 A1 | 2/2003 | Meka | |
| 2003/0046369 A1 | 3/2003 | Sim et al. | |
| 2003/0053420 A1 | 3/2003 | Duckett et al. | |
| 2003/0055962 A1 | 3/2003 | Freund et al. | |
| 2003/0065571 A1 | 4/2003 | Dutta | |
| 2003/0084300 A1 | 5/2003 | Koike | |
| 2003/0084318 A1 | 5/2003 | Schertz | |
| 2003/0084326 A1 | 5/2003 | Tarquini | |
| 2003/0093678 A1 | 5/2003 | Bowe et al. | |
| 2003/0099243 A1 | 5/2003 | Oh et al. | |
| 2003/0105716 A1 | 6/2003 | Sutton et al. | |
| 2003/0105739 A1 | 6/2003 | Essafi et al. | |
| 2003/0105854 A1 | 6/2003 | Thorsteinsson et al. | |
| 2003/0131116 A1 | 7/2003 | Jain et al. | |
| 2003/0135612 A1 | 7/2003 | Huntington | |
| 2003/0167392 A1 | 9/2003 | Fransdonk | |
| 2003/0185220 A1 | 10/2003 | Valenci | |
| 2003/0196081 A1 | 10/2003 | Savarda et al. | |
| 2003/0204741 A1 | 10/2003 | Schoen et al. | |
| 2003/0210694 A1* | 11/2003 | Jayaraman | H04L 67/1008 370/392 |
| 2003/0221101 A1 | 11/2003 | Micali | |
| 2003/0225796 A1 | 12/2003 | Matsubara | |
| 2003/0225841 A1 | 12/2003 | Song et al. | |
| 2003/0231632 A1 | 12/2003 | Haeberlen | |
| 2003/0233411 A1 | 12/2003 | Parry et al. | |
| 2004/0001498 A1 | 1/2004 | Chen et al. | |
| 2004/0003005 A1* | 1/2004 | Chaudhuri | G06F 17/30303 |
| 2004/0010484 A1 | 1/2004 | Foulger et al. | |
| 2004/0015579 A1 | 1/2004 | Cooper et al. | |
| 2004/0036716 A1 | 2/2004 | Jordahl | |
| 2004/0054779 A1 | 3/2004 | Takeshima et al. | |
| 2004/0059736 A1 | 3/2004 | Willse et al. | |
| 2004/0059920 A1 | 3/2004 | Godwin | |
| 2004/0064537 A1 | 4/2004 | Anderson et al. | |
| 2004/0071164 A1 | 4/2004 | Baum | |
| 2004/0093323 A1 | 5/2004 | Bluhm et al. | |
| 2004/0111406 A1 | 6/2004 | Udeshi et al. | |
| 2004/0111678 A1 | 6/2004 | Hara | |
| 2004/0114518 A1 | 6/2004 | MacFaden et al. | |
| 2004/0117414 A1 | 6/2004 | Braun et al. | |
| 2004/0120325 A1 | 6/2004 | Ayres | |
| 2004/0122863 A1 | 6/2004 | Sidman | |
| 2004/0122936 A1 | 6/2004 | Mizelle et al. | |
| 2004/0123237 A1* | 6/2004 | Lin | G06F 17/3071 715/234 |
| 2004/0139061 A1 | 7/2004 | Colossi et al. | |
| 2004/0139120 A1 | 7/2004 | Clark et al. | |
| 2004/0143598 A1 | 7/2004 | Drucker et al. | |
| 2004/0181513 A1 | 9/2004 | Henderson et al. | |
| 2004/0181690 A1 | 9/2004 | Rothermel et al. | |
| 2004/0193594 A1 | 9/2004 | Moore et al. | |
| 2004/0194141 A1 | 9/2004 | Sanders | |
| 2004/0196970 A1 | 10/2004 | Cole | |
| 2004/0205457 A1 | 10/2004 | Bent et al. | |
| 2004/0215612 A1 | 10/2004 | Brody | |
| 2004/0215626 A1 | 10/2004 | Colossi et al. | |
| 2004/0220944 A1 | 11/2004 | Behrens et al. | |
| 2004/0225645 A1 | 11/2004 | Rowney et al. | |
| 2004/0230572 A1 | 11/2004 | Omoigui | |
| 2004/0230891 A1 | 11/2004 | Pravetz et al. | |
| 2004/0249781 A1 | 12/2004 | Anderson | |
| 2004/0267753 A1 | 12/2004 | Hoche | |
| 2005/0004911 A1 | 1/2005 | Goldberg et al. | |
| 2005/0021715 A1 | 1/2005 | Dugatkin et al. | |
| 2005/0021743 A1 | 1/2005 | Fleig et al. | |

(56) References Cited

U.S. PATENT DOCUMENTS

| | | |
|---|---|---|
| 2005/0022114 A1 | 1/2005 | Shanahan et al. |
| 2005/0027881 A1 | 2/2005 | Figueira et al. |
| 2005/0033726 A1 | 2/2005 | Wu et al. |
| 2005/0033747 A1 | 2/2005 | Wittkotter |
| 2005/0033803 A1 | 2/2005 | Vleet et al. |
| 2005/0038788 A1 | 2/2005 | Dettinger et al. |
| 2005/0038809 A1 | 2/2005 | Abajian et al. |
| 2005/0044289 A1 | 2/2005 | Hendel et al. |
| 2005/0050028 A1 | 3/2005 | Rose et al. |
| 2005/0050205 A1 | 3/2005 | Gordy et al. |
| 2005/0055327 A1 | 3/2005 | Agrawal et al. |
| 2005/0055399 A1 | 3/2005 | Savchuk |
| 2005/0075103 A1 | 4/2005 | Hikokubo et al. |
| 2005/0086252 A1 | 4/2005 | Jones et al. |
| 2005/0091443 A1 | 4/2005 | Hershkovich et al. |
| 2005/0091532 A1 | 4/2005 | Moghe |
| 2005/0097441 A1 | 5/2005 | Herbach et al. |
| 2005/0108244 A1 | 5/2005 | Riise et al. |
| 2005/0114452 A1 | 5/2005 | Prakash |
| 2005/0120006 A1 | 6/2005 | Nye |
| 2005/0127171 A1 | 6/2005 | Ahuja et al. |
| 2005/0128242 A1 | 6/2005 | Suzuki |
| 2005/0131876 A1 | 6/2005 | Ahuja et al. |
| 2005/0132034 A1 | 6/2005 | de la Iglesia et al. |
| 2005/0132046 A1 | 6/2005 | de la Iglesia et al. |
| 2005/0132079 A1 | 6/2005 | de la Iglesia et al. |
| 2005/0132197 A1 | 6/2005 | Medlar |
| 2005/0132198 A1 | 6/2005 | Ahuja et al. |
| 2005/0132297 A1 | 6/2005 | Milic-Frayling et al. |
| 2005/0138110 A1 | 6/2005 | Redlich et al. |
| 2005/0138242 A1 | 6/2005 | Pope et al. |
| 2005/0138279 A1 | 6/2005 | Somasundaram |
| 2005/0149494 A1 | 7/2005 | Lindh et al. |
| 2005/0149504 A1 | 7/2005 | Ratnaparkhi |
| 2005/0166066 A1 | 7/2005 | Ahuja et al. |
| 2005/0177725 A1 | 8/2005 | Lowe et al. |
| 2005/0180341 A1 | 8/2005 | Nelson et al. |
| 2005/0182765 A1 | 8/2005 | Liddy |
| 2005/0188218 A1 | 8/2005 | Walmsley et al. |
| 2005/0203940 A1 | 9/2005 | Farrar et al. |
| 2005/0204129 A1 | 9/2005 | Sudia et al. |
| 2005/0228864 A1 | 10/2005 | Robertson |
| 2005/0235153 A1 | 10/2005 | Ikeda |
| 2005/0262044 A1 | 11/2005 | Chaudhuri et al. |
| 2005/0273614 A1 | 12/2005 | Ahuja et al. |
| 2005/0289181 A1 | 12/2005 | Deninger et al. |
| 2006/0005247 A1 | 1/2006 | Zhang et al. |
| 2006/0021045 A1 | 1/2006 | Cook |
| 2006/0021050 A1 | 1/2006 | Cook et al. |
| 2006/0036593 A1* | 2/2006 | Dean ................ G06F 17/3061 |
| 2006/0037072 A1 | 2/2006 | Rao et al. |
| 2006/0041560 A1 | 2/2006 | Forman et al. |
| 2006/0041570 A1 | 2/2006 | Lowe et al. |
| 2006/0041760 A1 | 2/2006 | Huang |
| 2006/0047675 A1 | 3/2006 | Lowe et al. |
| 2006/0075228 A1 | 4/2006 | Black et al. |
| 2006/0080130 A1 | 4/2006 | Choksi |
| 2006/0083180 A1 | 4/2006 | Baba et al. |
| 2006/0106793 A1 | 5/2006 | Liang |
| 2006/0106866 A1 | 5/2006 | Green et al. |
| 2006/0150249 A1 | 7/2006 | Gassen et al. |
| 2006/0167896 A1 | 7/2006 | Kapur et al. |
| 2006/0184532 A1 | 8/2006 | Hamada et al. |
| 2006/0235811 A1 | 10/2006 | Fairweather |
| 2006/0242126 A1 | 10/2006 | Fitzhugh |
| 2006/0242313 A1 | 10/2006 | Le et al. |
| 2006/0242694 A1 | 10/2006 | Gold |
| 2006/0251109 A1 | 11/2006 | Muller et al. |
| 2006/0253445 A1 | 11/2006 | Huang et al. |
| 2006/0271506 A1 | 11/2006 | Bohannon et al. |
| 2006/0272024 A1 | 11/2006 | Huang et al. |
| 2006/0288216 A1 | 12/2006 | Buhler et al. |
| 2007/0006293 A1 | 1/2007 | Balakrishnan et al. |
| 2007/0011309 A1 | 1/2007 | Brady et al. |
| 2007/0028039 A1 | 2/2007 | Gupta et al. |
| 2007/0036156 A1 | 2/2007 | Liu et al. |
| 2007/0039049 A1 | 2/2007 | Kupferman et al. |
| 2007/0050334 A1 | 3/2007 | Deninger et al. |
| 2007/0050381 A1 | 3/2007 | Hu et al. |
| 2007/0050467 A1 | 3/2007 | Borrett et al. |
| 2007/0050846 A1 | 3/2007 | Xie et al. |
| 2007/0081471 A1 | 4/2007 | Talley et al. |
| 2007/0094394 A1 | 4/2007 | Singh et al. |
| 2007/0106660 A1 | 5/2007 | Stern et al. |
| 2007/0106685 A1 | 5/2007 | Houh et al. |
| 2007/0106693 A1 | 5/2007 | Houh et al. |
| 2007/0110089 A1 | 5/2007 | Essafi et al. |
| 2007/0112837 A1 | 5/2007 | Houh et al. |
| 2007/0112838 A1 | 5/2007 | Bjarnestam et al. |
| 2007/0116366 A1 | 5/2007 | Deninger et al. |
| 2007/0124384 A1 | 5/2007 | Howell et al. |
| 2007/0136599 A1 | 6/2007 | Suga |
| 2007/0139723 A1 | 6/2007 | Beadle et al. |
| 2007/0140128 A1 | 6/2007 | Klinker et al. |
| 2007/0143235 A1* | 6/2007 | Kummamuru .... G06F 17/30911 706/15 |
| 2007/0143559 A1 | 6/2007 | Yagawa |
| 2007/0150365 A1* | 6/2007 | Bolivar ................. G06Q 30/02 705/26.61 |
| 2007/0162609 A1 | 7/2007 | Pope et al. |
| 2007/0162954 A1 | 7/2007 | Pela |
| 2007/0185868 A1* | 8/2007 | Roth ................. G06F 17/30908 |
| 2007/0220607 A1 | 9/2007 | Sprosts et al. |
| 2007/0226504 A1 | 9/2007 | de la Iglesia et al. |
| 2007/0226510 A1 | 9/2007 | de la Iglesia et al. |
| 2007/0248029 A1 | 10/2007 | Merkey et al. |
| 2007/0260643 A1 | 11/2007 | Borden et al. |
| 2007/0266044 A1 | 11/2007 | Grondin et al. |
| 2007/0271254 A1 | 11/2007 | Iglesia et al. |
| 2007/0271371 A1* | 11/2007 | Singh Ahuja .......... H04L 43/18 709/224 |
| 2007/0271372 A1 | 11/2007 | Deninger et al. |
| 2007/0280123 A1 | 12/2007 | Atkins et al. |
| 2007/0294235 A1* | 12/2007 | Millett .............. G06F 17/30333 |
| 2008/0010256 A1* | 1/2008 | Lindblad .......... G06F 17/30911 |
| 2008/0027971 A1 | 1/2008 | Statchuk |
| 2008/0028467 A1 | 1/2008 | Kommareddy et al. |
| 2008/0030383 A1 | 2/2008 | Cameron |
| 2008/0071813 A1 | 3/2008 | Nair et al. |
| 2008/0082497 A1 | 4/2008 | Leblang et al. |
| 2008/0091408 A1 | 4/2008 | Roulland et al. |
| 2008/0112411 A1 | 5/2008 | Stafford et al. |
| 2008/0115125 A1 | 5/2008 | Stafford et al. |
| 2008/0127346 A1 | 5/2008 | Oh et al. |
| 2008/0140657 A1 | 6/2008 | Azvine et al. |
| 2008/0141117 A1 | 6/2008 | King et al. |
| 2008/0159627 A1 | 7/2008 | Sengamedu |
| 2008/0235163 A1 | 9/2008 | Balasubramanian et al. |
| 2008/0263019 A1 | 10/2008 | Harrison et al. |
| 2008/0270462 A1 | 10/2008 | Thomsen |
| 2008/0276295 A1 | 11/2008 | Nair |
| 2009/0070327 A1 | 3/2009 | Loeser et al. |
| 2009/0070328 A1 | 3/2009 | Loeser et al. |
| 2009/0070459 A1 | 3/2009 | Cho et al. |
| 2009/0100055 A1 | 4/2009 | Wang |
| 2009/0157659 A1 | 6/2009 | Satoh et al. |
| 2009/0158430 A1 | 6/2009 | Borders |
| 2009/0178110 A1 | 7/2009 | Higuchi |
| 2009/0187568 A1 | 7/2009 | Morin |
| 2009/0193033 A1 | 7/2009 | Ramzan et al. |
| 2009/0216752 A1* | 8/2009 | Terui ................. G06F 17/30616 |
| 2009/0222442 A1 | 9/2009 | Houh et al. |
| 2009/0232391 A1 | 9/2009 | Deninger et al. |
| 2009/0235150 A1 | 9/2009 | Berry |
| 2009/0254516 A1* | 10/2009 | Meiyyappan ..... G06F 17/30492 |
| 2009/0254532 A1 | 10/2009 | Yang et al. |
| 2009/0271367 A1* | 10/2009 | Dharawat ......... G06F 17/30705 |
| 2009/0288026 A1 | 11/2009 | Barabas et al. |
| 2009/0288164 A1 | 11/2009 | Adelstein et al. |
| 2009/0300709 A1 | 12/2009 | Chen et al. |
| 2009/0326925 A1* | 12/2009 | Crider ....................... G06F 8/30 704/9 |
| 2010/0011016 A1 | 1/2010 | Greene |

(56) References Cited

U.S. PATENT DOCUMENTS

| | | | |
|---|---|---|---|
| 2010/0011410 A1* | 1/2010 | Liu | H04L 63/20 726/1 |
| 2010/0023726 A1 | 1/2010 | Aviles | |
| 2010/0037324 A1 | 2/2010 | Grant et al. | |
| 2010/0042625 A1 | 2/2010 | Zoellner et al. | |
| 2010/0088317 A1 | 4/2010 | Bone et al. | |
| 2010/0100551 A1* | 4/2010 | Knauft | G06F 17/30616 707/741 |
| 2010/0121853 A1 | 5/2010 | de la Iglesia et al. | |
| 2010/0174528 A1 | 7/2010 | Oya et al. | |
| 2010/0185622 A1 | 7/2010 | Deninger et al. | |
| 2010/0191732 A1 | 7/2010 | Lowe et al. | |
| 2010/0195909 A1* | 8/2010 | Wasson | G06F 17/241 382/176 |
| 2010/0268959 A1 | 10/2010 | Lowe et al. | |
| 2010/0332502 A1 | 12/2010 | Carmel et al. | |
| 2011/0004599 A1 | 1/2011 | Deninger et al. | |
| 2011/0040552 A1 | 2/2011 | Van Guilder et al. | |
| 2011/0106846 A1 | 5/2011 | Matsumoto et al. | |
| 2011/0131199 A1 | 6/2011 | Simon et al. | |
| 2011/0149959 A1 | 6/2011 | Liu et al. | |
| 2011/0167212 A1 | 7/2011 | Lowe et al. | |
| 2011/0167265 A1 | 7/2011 | Ahuja et al. | |
| 2011/0196911 A1 | 8/2011 | de la Iglesia et al. | |
| 2011/0197284 A1 | 8/2011 | Ahuja et al. | |
| 2011/0208861 A1 | 8/2011 | Deninger et al. | |
| 2011/0219237 A1 | 9/2011 | Ahuja et al. | |
| 2011/0258197 A1 | 10/2011 | de la Iglesia et al. | |
| 2011/0276575 A1 | 11/2011 | de la Iglesia et al. | |
| 2011/0276709 A1 | 11/2011 | Deninger et al. | |
| 2012/0114119 A1 | 5/2012 | Ahuja et al. | |
| 2012/0179687 A1 | 7/2012 | Liu | |
| 2012/0180137 A1 | 7/2012 | Liu | |
| 2012/0191722 A1 | 7/2012 | Deninger et al. | |
| 2013/0246334 A1 | 9/2013 | Ahuja et al. | |
| 2013/0246335 A1 | 9/2013 | Ahuja et al. | |
| 2013/0246336 A1 | 9/2013 | Ahuja et al. | |
| 2013/0246337 A1 | 9/2013 | Ahuja et al. | |
| 2013/0246338 A1 | 9/2013 | Doddapaneni | |
| 2013/0246371 A1 | 9/2013 | Ahuja et al. | |
| 2013/0246377 A1* | 9/2013 | Gaitonde | H04L 63/0236 707/697 |
| 2013/0246424 A1 | 9/2013 | Deninger et al. | |
| 2013/0246431 A1 | 9/2013 | Ahuja et al. | |
| 2013/0246925 A1 | 9/2013 | Ahuja et al. | |
| 2013/0247208 A1 | 9/2013 | Bishop | |
| 2013/0254838 A1 | 9/2013 | Ahuja et al. | |
| 2013/0268548 A1 | 10/2013 | Timm et al. | |
| 2014/0032919 A1 | 1/2014 | Ahuja et al. | |
| 2014/0164314 A1 | 6/2014 | Ahuja et al. | |
| 2014/0164442 A1 | 6/2014 | de la Iglesia | |
| 2014/0289416 A1 | 9/2014 | Ahuja et al. | |
| 2015/0067810 A1 | 3/2015 | Ahuja et al. | |
| 2015/0106875 A1 | 4/2015 | Ahuja et al. | |
| 2016/0142442 A1 | 5/2016 | Deninger | |

FOREIGN PATENT DOCUMENTS

| | | |
|---|---|---|
| JP | 6-98770 | 4/1994 |
| JP | 2005-63030 | 3/2005 |
| JP | 2005-209193 | 8/2005 |
| JP | 5727027 | 4/2015 |
| KR | 10-2008-0087021 | 9/2008 |
| KR | 10-2014-0041391 | 4/2014 |
| KR | 10-1538305 | 7/2015 |
| WO | WO 2001/047205 | 6/2001 |
| WO | WO 2001/099373 | 12/2001 |
| WO | WO 2004/008310 | 1/2004 |
| WO | WO 2011/080745 | 7/2011 |
| WO | WO 2012/060892 | 5/2012 |

OTHER PUBLICATIONS

U.S. Appl. No. 10/864,153, now issued as U.S. Pat. No. 8,656,039.
U.S. Appl. No. 14/181,521, now issued as U.S. Pat. No. 9,092,471.
U.S. Appl. No. 10/816,422, now abandoned.
U.S. Appl. No. 10/854,005, now issued as U.S. Pat. No. 8,548,170.
U.S. Appl. No. 14/042,202, now issued as U.S. Pat. No. 9,374,225.
U.S. Appl. No. 13/099,516, now abandoned.
U.S. Appl. No. 12/360,537, now issued as U.S. Pat. No. 8,560,534.
U.S. Appl. No. 13/049,533, now issued as U.S. Pat. No. 8,707,008.
U.S. Appl. No. 13/024,923, now issued as U.S. Pat. No. 8,730,955.
U.S. Appl. No. 12/873,860, now issued as U.S. Pat. No. 8,554,774.
U.S. Appl. No. 13/431,678, now issued as U.S. Pat. No. 8,463,800.
U.S. Appl. No. 11/388,734, now issued as U.S. Pat. No. 8,504,537.
U.S. Appl. No. 11/389,630, now abandoned.
U.S. Appl. No. 13/188,441, now abandoned.
U.S. Appl. No. 13/089,158, now issued as U.S. Pat. No. 8,683,035.
U.S. Appl. No. 14/222,477, now issued as U.S. Pat. No. 9,094,338.
U.S. Appl. No. 11/900,964, now abandoned.
U.S. Appl. No. 13/422,791, now issued as U.S. Pat. No. 8,635,706.
U.S. Appl. No. 13/424,249, now issued as U.S. Pat. No. 8,601,537.
U.S. Appl. No. 12/190,536, now issued as U.S. Pat. No. 9,253,154.
U.S. Appl. No. 12/352,720, now issued as U.S. Pat. No. 8,850,591.
U.S. Appl. No. 13/436,275, now issued as U.S. Pat. No. 9,195,937.
U.S. Appl. No. 13/896,210, now issued as U.S. Pat. No. 8,918,359.
U.S. Appl. No. 12/410,905, now issued as U.S. Pat. No. 8,667,121.
U.S. Appl. No. 12/939,340, now issued as U.S. Pat. No. 8,806,615.
U.S. Appl. No. 14/576,781 now issued as U.S. Pat. No. 9,313,232.
U.S. Appl. No. 13/337,737, now abandoned.
U.S. Appl. No. 13/338,060, now abandoned.
U.S. Appl. No. 13/338,159, now issued as U.S. Pat. No. 8,700,561.
U.S. Appl. No. 13/338,195, now abandoned.
U.S. Appl. No. 14/157,130, now issued as U.S. Pat. No. 9,430,564.
U.S. Appl. No. 10/815,240, now issued as U.S. Pat. No. 7,984,175.
U.S. Appl. No. 10/814,093, now issued as U.S. Pat. No. 7,899,828.
U.S. Appl. No. 12/967,013, now issued as U.S. Pat. No. 8,301,635.
U.S. Appl. No. 10/815,239, now issued as U.S. Pat. No. 7,814,327.
U.S. Appl. No. 12/873,061, now issued as U.S. Pat. No. 8,166,307.
U.S. Appl. No. 10/995,454, now issued as U.S. Pat. No. 7,774,604.
U.S. Appl. No. 12/829,220, now issued as U.S. Pat. No. 8,271,794.
U.S. Appl. No. 10/995,455, now issued as U.S. Pat. No. 7,930,540.
U.S. Appl. No. 13/047,068, now issued as U.S. Pat. No. 8,307,206.
U.S. Appl. No. 10/863,311, now issued as U.S. Pat. No. 7,434,058.
U.S. Appl. No. 10/876,205, now issued as U.S. Pat. No. 7,962,591.
U.S. Appl. No. 11/031,582, now issued as U.S. Pat. No. 7,483,916.
U.S. Appl. No. 11/168,104, now issued as U.S. Pat. No. 7,949,849.
U.S. Appl. No. 11/202,438, now issued as U.S. Pat. No. 7,907,608.
U.S. Appl. No. 11/218,167, now issued as U.S. Pat. No. 7,818,326.
U.S. Appl. No. 11/254,436, now issued as U.S. Pat. No. 7,730,011.
U.S. Appl. No. 12/751,876, now issued as U.S. Pat. No. 8,176,049.
U.S. Appl. No. 11/284,553, now issued as U.S. Pat. No. 7,657,104.
U.S. Appl. No. 12/472,150, now issued as U.S. Pat. No. 8,200,026.
U.S. Appl. No. 11/439,484, now issued as U.S. Pat. No. 8,010,689.
U.S. Appl. No. 11/439,112, now issued as U.S. Pat. No. 7,958,227.
U.S. Appl. No. 11/439,488, now issued as U.S. Pat. No. 7,689,614.
U.S. Appl. No. 12/690,153, now issued as U.S. Pat. No. 8,005,863.
U.S. Appl. No. 13/187,421, now issued as U.S. Pat. No. 8,307,007.
U.S. Appl. No. 12/171,232, now issued as U.S. Pat. No. 8,205,242.
U.S. Appl. No. 12/358,399, now issued as U.S. Pat. No. 8,473,442.
U.S. Appl. No. 12/410,875, now issued as U.S. Pat. No. 8,447,722.
U.S. Appl. No. 14/457,038, now issued as U.S. Pat. No. 9,794,254.
U.S. Appl. No. 13/024,923, filed Feb. 10, 2011, entitled "High Speed Packet Capture," Inventor(s) Weimin Liu, et al.
U.S. Appl. No. 13/047,068, filed Mar. 14, 2011, entitled "Cryptographic Policy Enforcement," Inventor(s) Ratinder Paul Singh Ahuja, et al.
U.S. Appl. No. 13/049,533, filed Mar. 16, 2011, entitled "File System for a Capture System," Inventor(s) Rick Lowe, et al.
U.S. Appl. No. 13/089,158, filed Apr. 18, 2011, entitled "Attributes of Captured Objects in a Capture System," Inventor(s) Ratinder Paul Singh Ahuja, et al.

(56) References Cited

OTHER PUBLICATIONS

U.S. Appl. No. 13/099,516, filed May 3, 2011, entitled "Object Classification in a Capture System," Inventor(s) William Deninger, et al.
U.S. Appl. No. 11/254,436, filed Oct. 19, 2005, entitled "Attributes of Captured Objects in a Capture System," Inventor(s) William Deninger et al.
U.S. Appl. No. 11/900,964, filed Sep. 14, 2007, entitled "System and Method for Indexing a Capture System," Inventor(s) Ashok Doddapaneni et al.
U.S. Appl. No. 12/190,536, filed Aug. 12, 2008, entitled "Configuration Management for a Capture/Registration System," Inventor(s) Jitendra B. Gaitonde et al.
U.S. Appl. No. 12/352,720, filed Jan. 13, 2009, entitled "System and Method for Concept Building," Inventor(s) Ratinder Paul Singh Ahuja et al.
U.S. Appl. No. 12/354,688, filed Jan. 15, 2009, entitled "System and Method for Intelligent Term Grouping," Inventor(s) Ratinder Paul Ahuja et al.
U.S. Appl. No. 12/358,399, filed Jan. 23, 2009, entitled "System and Method for Intelligent State Management," Inventor(s) William Deninger et al.
U.S. Appl. No. 12/360,537, filed Jan. 27, 2009, entitled "Database for a Capture System," Inventor(s) Rick Lowe et al.
U.S. Appl. No. 12/410,875, filed Mar. 25, 2009, entitled "System and Method for Data Mining and Security Policy Management," Inventor(s) Ratinder Paul Singh Ahuja et al.
U.S. Appl. No. 12/410,905, filed Mar. 25, 2009, entitled "System and Method for Managing Data and Policies," Inventor(s) Ratinder Paul Singh Ahuja et al.
U.S. Appl. No. 12/690,153, filed Jan. 20, 2010, entitled "Query Generation for a Capture System," Inventor(s) Erik de la Iglesia, et al.
U.S. Appl. No. 12/751,876, filed Mar. 31, 2010, entitled "Attributes of Captured Objects in a Capture System," Inventor(s) William Deninger, et al.
U.S. Appl. No. 12/829,220, filed Jul. 1, 2010, entitled "Verifying Captured Objects Before Presentation," Inventor(s) Rick Lowe, et al.
U.S. Appl. No. 12/873,061, filed Aug. 31, 2010, entitled "Document Registration," Inventor(s) Ratinder Paul Singh Ahuja, et al.
U.S. Appl. No. 12/873,860, filed Sep. 1, 2010, entitled "A System and Method for Word Indexing in a Capture System and Querying Thereof," Inventor(s) William Deninger, et al.
U.S. Appl. No. 12/939,340, filed Nov. 3, 2010, entitled "System and Method for Protecting Specified Data Combinations," Inventor(s) Ratinder Paul Singh Ahuja, et al.
U.S. Appl. No. 12/967,013, filed Dec. 13, 2010, entitled "Tag Data Structure for Maintaining Relational Data Over Captured Objects," Inventor(s) Erik de la Iglesia, et al.
U.S. Appl. No. 13/168,739, filed Jun. 24, 2011, entitled "Method and Apparatus for Data Capture and Analysis System," Inventor(s) Erik de la Iglesia, et al.
U.S. Appl. No. 13/187,421, filed Jul. 20, 2011, entitled "Query Generation for a Capture System," Inventor(s) Erik de la Iglesia, et al.
U.S. Appl. No. 13/188,441 filed Jul. 21, 2011, entitled "Locational Tagging in a Capture System," Inventor(s) William Deninger et al.
U.S. Appl. No. 13/422,791, filed on Mar. 16, 2012, entitled "System and Method for Data Mining and Security Policy Management", Inventor, Weimin Liu.
U.S. Appl. No. 13/424,249, filed on Mar. 19, 2012, entitled "System and Method for Data Mining and Security Policy Management", Inventor, Weimin Liu.
U.S. Appl. No. 13/431,678, filed on Mar. 27, 2012, entitled "Attributes of Captured Objects in a Capture System", Inventors William Deninger, et al.
U.S. Appl. No. 13/436,275 filed on Mar. 30, 2012, entitled "System and Method for Intelligent State Management", Inventors William Deninger, et al.
U.S. Appl. No. 13/337,737, filed Dec. 27, 2011, entitled "System and Method for Providing Data Protection Workflows in a Network Environment", Inventor(s) Ratinder Paul Singh Ahuja, et al.
U.S. Appl. No. 13/338,060, filed Dec. 27, 2011, entitled "System and Method for Providing Data Protection Workflows in a Network Environment", Inventor(s) Ratinder Paul Singh Ahuja, et al.
U.S. Appl. No. 13/338,159, filed Dec. 27, 2011, entitled "System and Method for Providing Data Protection Workflows in a Network Environment", Inventor(s) Ratinder Paul Singh Ahuja, et al.
U.S. Appl. No. 13/338,195, filed Dec. 27, 2011, entitled "System and Method for Providing Data Protection Workflows in a Network Environment", Inventor(s) Ratinder Paul Singh Ahuja, et al.
U.S. Appl. No. 14/157,130, filed Jan. 16, 2014, entitled "System and Method for Providing Data Protection Workflows in a Network Environment", Inventor(s) Ratinder Paul Singh Ahuja, et al.
U.S. Appl. No. 14/042,202, filed Sep. 30, 2013, entitled "Document De-Registration", Inventors(s) Ratinder Paul Singh Ahuja, et al.
U.S. Appl. No. 13/896,210, filed May 16, 2013, entitled "System and Method for Data Mining and Security Policy Management" Inventor(s) Ratinder Paul Singh Ahuja et al.
U.S. Appl. No. 14/181,521, filed Feb. 14, 2014.
U.S. Appl. No. 14/222,477, filed Mar. 21, 2014.
U.S. Appl. No. 14/457,038 filed Aug. 11, 2014.
Advisory Action from U.S. Appl. No. 10/815,239 dated May 13, 2009.
Advisory Action from U.S. Appl. No. 10/854,005 dated Aug. 5, 2009.
Advisory Action from U.S. Appl. No. 11/388,734 dated Jan. 26, 2009.
Office Action from U.S. Appl. No. 10/815,239, dated Jun. 13, 2007.
Office Action from U.S. Appl. No. 10/815,239, dated Feb. 8, 2008.
Final Office Action from U.S. Appl. No. 10/815,239 dated Mar. 17, 2009.
Non-Final Office Action from U.S. Appl. No. 10/815,239 dated Aug. 18, 2009.
Final Office Action from U.S. Appl. No. 10/815,239 dated Nov. 30, 2009.
Non-Final Office Action from U.S. Appl. No. 10/815,239 dated Jun. 8, 2009.
Notice of Allowance for U.S. Appl. No. 10/815,239 dated Feb. 24, 2010.
Notice of Allowance for U.S. Appl. No. 10/815,239 dated Jun. 1, 2010.
Non-Final Office Action from U.S. Appl. No. 10/854,005 dated Feb. 5, 2008.
Non-Final Office Action from U.S. Appl. No. 10/854,005 dated Nov. 5, 2008.
Final Office Action from U.S. Appl. No. 10/854,005 dated May 11, 2009.
Non-Final Office Action from U.S. Appl. No. 10/854,005 dated Oct. 15, 2009.
Non-Final Office Action from U.S. Appl. No. 10/854,005 dated Mar. 25, 2010.
Final Office Action from U.S. Appl. No. 10/854,005 dated Sep. 14, 2010.
Final Office Action from U.S. Appl. No. 10/854,005 dated Dec. 2, 2010.
Office Action from U.S. Appl. No. 10/854,005, dated Feb. 16, 2011.
Final Office Action from U.S. Appl. No. 10/854,005 dated Aug. 4, 2011.
Notice of Allowance for U.S. Appl. No. 10/854,005 dated Aug. 23, 2012.
Notice of Allowance for U.S. Appl. No. 10/854,005 dated Jun. 3, 2013.
Office Action from U.S. Appl. No. 11/388,734, dated Feb. 5, 2008.
Final Office Action from U.S. Appl. No. 11/388,734, dated Jul. 24, 2008.
Notice of Allowance for U.S. Appl. No. 11/388,734 dated Dec. 11, 2012.
Notice of Allowance for U.S. Appl. No. 11/388,734 dated Apr. 4, 2013.
Office Action from U.S. Appl. No. 14/042,202, dated Aug. 21, 2015.

(56) References Cited

OTHER PUBLICATIONS

Notice of Allowance from U.S. Appl. No. 14/042,202, dated Feb. 19, 2016.
Non-Final Office Action from U.S. Appl. No. 14/457,038, dated May 11, 2015.
Final Office Action from U.S. Appl. No. 14/457,038, dated Aug. 24, 2015.
Office Action from U.S. Appl. No. 14/457,038, dated Feb. 22, 2016.
Office Action from U.S. Appl. No. 14/457,038, dated Sep. 6, 2016.
Notice of Allowance from U.S. Appl. No. 14/457,038, dated Jan. 27, 2017.
Notice of Allowance from U.S. Appl. No. 14/457,038, dated May 22, 2017.
Office Action from U.S. Appl. No. 14/942,587, dated Jun. 30, 2016.
A Model-Driven Approach for Documenting Business and Requirements Interdependencies for Architectural Decision Making Berrocal, J.; Garcia Alonso, J.; Vicente Chicote, C.; Murillo, J.M. Latin America Transactions, IEEE (Revista IEEE America Latina) Year: 2014, vol. 12, Issue: 2 Pages: 227-235, DOI: 10.1109/TLA.2014.6749542.
ACM Digital Library, "Tuple Token Registration," search on Mar. 8, 2018 4:36:08 PM, 5 pages retrieved and printed from https://dl.acm.org/results.cfm?query=tuple+registration+token&Go.x=44&Go.y=2.
Analysis of Stroke Intersection for Overlapping PGF Elements Yan Chen; Xiaoqing Lu; Jingwei Qu; Zhi Tang 2016 12th IAPR Workshop on Document Analysis Systems (DAS) Year: 2016; pp. 245-250, DOI: 10.1109/DAS.2016.11 IEEE Conference Publications.
Chapter 1. Introduction, "Computer Program product for analyzing network traffic," Ethereal. Computer program product for analyzing network traffic, pp. 17-26, http://web.archive.org/web/20030315045117/www.ethereal.com/distribution/docs/user-guide, approximated copyright 2004-2005, printed Mar. 12, 2009.
Compression of Boolean inverted files by document ordering Gelbukh, A.; Sangyong Han; Sidorov, G. Natural Language Processing and Knowledge Engineering, 2003. Proceedings. 2003 International Conference on Year: 2003 pp. 244-249, DOI: 10.1109/NLPKE.2003.1275907.
Compressing Inverted Files in Scalable Information Systems by Binary Decision Diagram Encoding Chung-Hung Lai; Tien-Fu Chen Supercomputing, ACM/IEEE 2001 Conference Year: 2001 pp. 36-36, DOI: 10.1109/SC.2001.10019.
Further Result on Distribution Properties of Compressing Sequences Derived From Primitive Sequences Over Oun-Xiong Zheng; Wen-Feng Qi; Tian Tian Information Theory, IEEE Transactions on Year: 2013, vol. 59, Issue: 8 pp. 5016-5022, DOI: 10.1109/TIT.2013.2258712.
Google Scholar, "Token Registration Tuples" search on Mar. 8, 2018 4:35:17 PM, 2 pages retrieved and printed from https://scholar.google.com/scholar?hl=en&as_sdt=0%2C44&q=token+registration+tuples&btnG=.
Peter Gordon, "Data Leakage—Threats and Mitigation", IN: SANS Inst. (2007). http://www.sans.org/reading-room/whitepapers/awareness/data-leakage-mitigation-1931?show=data-leakage-threats-mitigation-1931&cat=awareness (69 pages).
Han, OLAP Mining: An Integration of OLAP with Data Mining, Oct. 1997, pp. 1-18.
IEEE Xplore, "Tuple Token Registration," search on Mar. 8, 2018, 8 pages. retrieved and printed from http://ieeexplore.ieee.org/search/searchresult.jsp?newsearch=true&queryText=tuple%20token%20registration.
Integrated Modeling and Verification of Real-Time Systems through Multiple Paradigms Marcello M. Bersani: Carlo A. Furia; Matteo Pradelia; Matteo Rossi 2009 Seventh IEEE International Conference on Software Engineering and Formal Methods Year: 2—0 pp. 13-22, DOI: 10.1109/SEFM.2009.16 IEEE Conference Publications.
Mao et al. "MOT: Memory Online Tracing of Web Information System," Proceedings of the Second International Conference on Web Information Systems Engineering (WISE '01); pp. 271-277, (IEEE0-0/7695-1393-X/02) Aug. 7, 2002 (7 pages).
Microsoft Outlook, Out look, copyright 1995-2000, 2 pages.
Niemi, Constructing OLAP Cubes Based on Queries, Nov. 2001, pp. 1-7.
Preneel, Bart, "Cryptographic Hash Functions", Proceedings of the $3^{rd}$Symposium on State and Progress of Research in Cryptography, 1993, pp. 161-171.
Schultz, Data Mining for Detection of New Malicious Executables, May 2001, pp. 1-13.
Walter Allasia et al., Indexing and Retrieval of Multimedia Metadata on a Secure DHT, University of Torino, Italy, Department of Computer Science, Aug. 31, 2008, 16 pages.
Webopedia, definition of "filter", 2002, p. 1.
Werth, T. et al., "Chapter 1—DAG Mining in Procedural Abstraction," Programming Systems Group; Computer Science Department, University of Erlangen-Nuremberg, Germany (cited by Examiner in Sep. 19, 2011 Nonfinal Rejection).
International Search Report and Written Opinion and Declaration of Non-Establishment of International Search Report for International Application No. PCT/US2011/024902 dated Aug. 1, 2011.
International Preliminary Report on Patentability Written Opinion of the International Searching Authority for International Application No. PCT/US2011/024902 dated May 7, 2013.
Office Action issued by the Chinese Patent Office dated Mar. 10, 2016 in Chinese Patent Application No. 201180058414.4.
Notice of Allowance issued by the Chinese Patent Office dated Sep. 17, 2016 in Chinese Patent Application No. 201180058414.4.
EPO Official Action for EP Application No. 11 704 904.9 dated Feb. 15, 2017.
EPO Official Action for EP Application No. 11 704 904.9 dated Feb. 19, 2018.
English Translation of the Notice of Allowance, KIPO dated Apr. 15, 2015, Notice of Allowance Summary.
Korean Patent Office Notice of Preliminary Rejection for Korean Patent Application No. 2013-7014404 dated Oct. 8, 2014 [Translation provided].
Korean Patent Office Notice of Preliminary Rejection for Korean Patent Application No. 2013-7014404 dated Apr. 22, 2014 [Translation provided].
Japanese Patent Office Notification of Reasons for Refusal for JP Patent Application No. 2013-537659 dated Jul. 22, 2014 [Translation provided].

\* cited by examiner

SYSTEM AND METHOD FOR PROTECTING SPECIFIED DATA COMBINATIONS

RELATED U.S. APPLICATION INFORMATION

This application is a continuation of (and claims the benefit under 35 U.S.C. § 120) of U.S. application Ser. No. 14/457,038, filed Aug. 11, 2014, entitled "SYSTEM AND METHOD FOR PROTECTING SPECIFIED DATA COMBINATIONS," Inventor(s) Ratinder Paul Singh Ahuja et al., which application is a continuation of (and claims the benefit under 35 U.S.C. § 120) of U.S. application Ser. No. 12/939,340, filed Nov. 4, 2010, entitled "SYSTEM AND METHOD FOR PROTECTING SPECIFIED DATA COMBINATIONS," Inventor(s) Ratinder Paul Singh Ahuja et al., issued as U.S. Pat. No. 8,806,615 on Aug. 12, 2014, and this application is related to co-pending U.S. patent application Ser. No. 12/358,399, filed Feb. 25, 2009, entitled "SYSTEM AND METHOD FOR INTELLIGENT STATE MANAGEMENT," by William Deninger, et al., commonly assigned to the assignee hereof. The disclosures of these applications are considered part of and are incorporated by reference herein in their entireties.

TECHNICAL FIELD OF THE INVENTION

This invention relates in general to the field of data management and, more particularly, to a system and a method for protecting specified combinations of data.

BACKGROUND OF THE INVENTION

Computer networks have become indispensable tools for modern business. Enterprises can use networks for communications and, further, can store data in various forms and at various locations. Critical information frequently propagates over a network of a business enterprise. Certain federal and state regulations provide restrictions covering the dissemination of particular types of information by various organizations or businesses. Thus, in addition to the potential loss of proprietary information and the resulting negative impact to business, an enterprise may also face legal liability for the inadvertent or intentional leakage of certain data. Modern enterprises often employ numerous tools to control the dissemination of such information and many of these tools attempt to keep outsiders, intruders, and unauthorized personnel from accessing or receiving confidential, valuable, or otherwise sensitive information. Commonly, these tools can include firewalls, intrusion detection systems, and packet sniffer devices.

The ability to offer a system or a protocol that provides an effective data management system, capable of securing and controlling the movement of important information, can be a significant challenge to security professionals, component manufacturers, service providers, and system administrators alike.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method in one example embodiment includes extracting a plurality of data elements from a record of a data file, tokenizing the plurality of data elements into a plurality of tokens, and storing the plurality of tokens in a first tuple of a registration list. The method further includes selecting one of the plurality of tokens as a token key for the first tuple, where the token key occurs less frequently in the registration list than each of the other tokens in the first tuple. In more specific embodiments, at least one data element is an expression element having a character pattern matching a predefined expression pattern, where the predefined expression pattern represents at least two words and a separator between the words. In other specific embodiments, at least one data element is a word defined by a character pattern of one or more consecutive essential characters. Other more specific embodiments include determining an end of the record by recognizing a predefined delimiter.

A method in another example embodiment includes extracting a plurality of data elements from an object, tokenizing the plurality of data elements into a plurality of object tokens, and identifying a first tuple in the registration list. The method further includes determining if each one of a plurality of associated tokens in the first tuple corresponds to at least one of the object tokens. Additionally, the method includes validating an event if an amount of correspondence between the plurality of associated tokens in the first tuple and the plurality of object tokens meets a predetermined threshold. In more specific embodiments, the predetermined threshold is met when each of the associated tokens in the first tuple corresponds to at least one of the plurality of object tokens.

Example Embodiments

Figure 1:
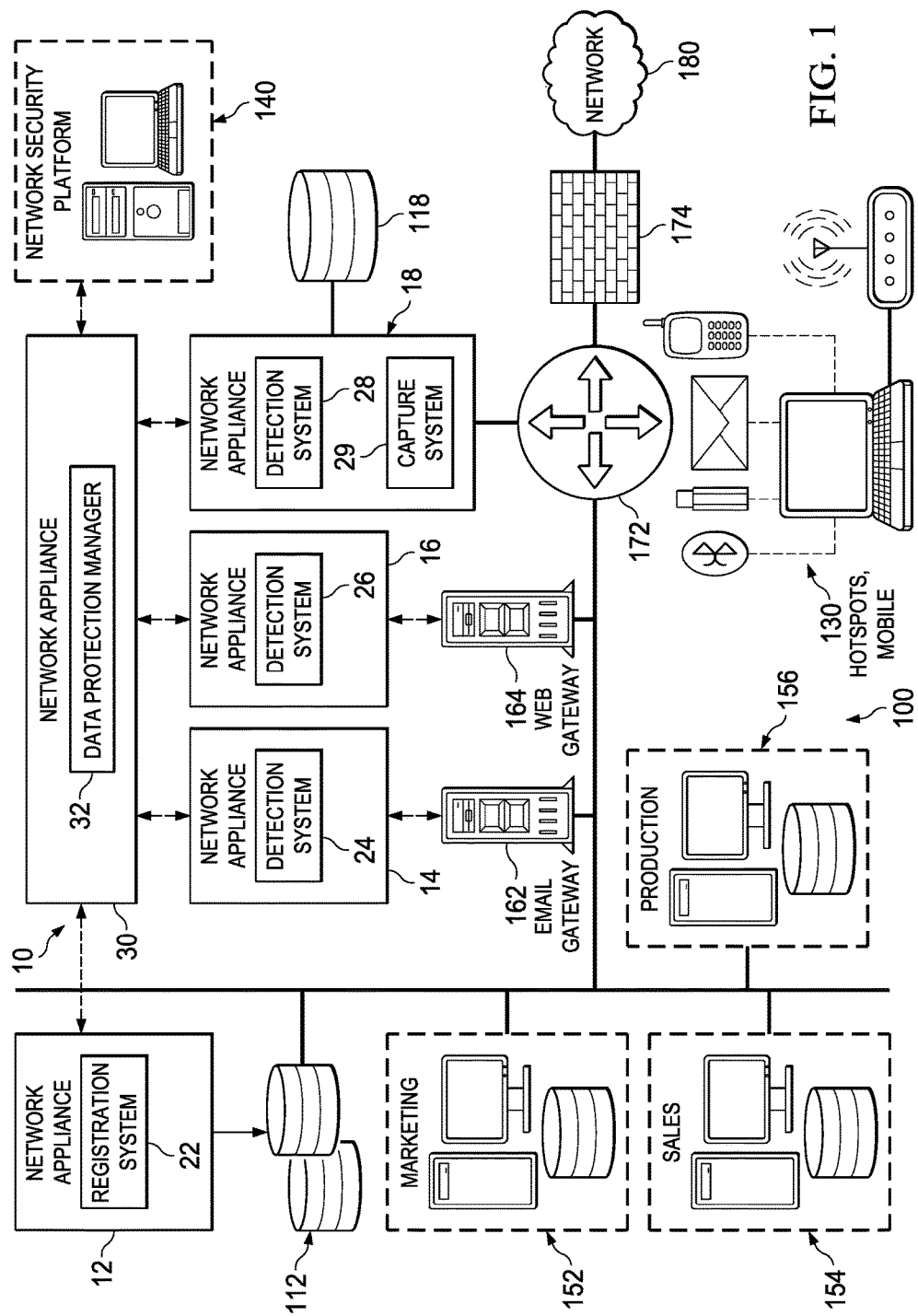
FIG. 1 is a simplified block diagram of an exemplary implementation of a system for protecting specified data combinations in a network environment in accordance with one embodiment of the present disclosure.

FIG. 1 is a simplified block diagram illustrating an example implementation of a data combination protection system 10 for registering and detecting specified combinations of data in an exemplary network 100. Data combination protection system 10 may include multiple network elements such as a network appliance 12 having a registration system 22 and a plurality of network appliances 14, 16, and 18 having detection systems 24, 26, and 28, respectively. These network appliances 12, 14, 16, and 18 can be managed by or otherwise coupled to another network element such as network appliance 30 with a data protection manager 32. In addition, a network security platform 140 may provide an existing infrastructure of network security for network 100 and may be suitably integrated with data combination protection system 10.

The network environment illustrated in FIG. 1 may be generally configured or arranged to represent any communication architecture capable of exchanging packets. Such configurations may include separate divisions of a given business entity such as that which is shown for purposes of illustration in FIG. 1 (e.g., a Marketing segment 152, a Sales segment 154, a Production segment 156). In addition, other common network elements such as an email gateway 162, a web gateway 164, a switch 172, a firewall 174, and at least one client device 130 may also be provided in network 100. Network 100 may also be configured to exchange packets with other networks, such as Internet 180, through firewall 174.

Data combination protection system 10 can help organizations protect against the inadvertent and intentional disclosures of confidential data from a network environment. Embodiments of data combination protection system 10 can be used to register specified combinations of data elements and to detect registered data combinations within objects of the network environment. For example, data elements that are sufficiently distinctive when combined to identify an individual, and which can potentially expose confidential or sensitive information about the individual, can be registered as a combination and detected in objects in the network by data combination protection system 10. System 10 can create a registration list with each specified combination or set of data elements represented in a separate tuple or record of the registration list. The registering operations to create these tuples in the registration list can be performed on any data file having one or more sets of data elements with each set of data elements delimited from other sets of data elements by a predefined delimiter. The registration list can be indexed with keys, where each key corresponds to one of the data elements represented in a tuple.

Data combination protection system 10 can perform detecting operations to find one or more registered combinations of data elements in an object (e.g., word processing document, spreadsheet, database, electronic mail document, plaintext file, any human language text file, etc.) in the network environment. The object could be captured in the network and formatted for transmission (e.g., HTML, FTP, SMTP, Webmail, etc.), or stored in a database, file system, or other storage repository. In one embodiment, when all of the data elements in a registered combination of data elements (i.e., represented in one tuple of the registration list) are detected in an object, an event is flagged or validated and the object may be prevented from being transmitted and/or may be reported for a network operator or other authorized person to monitor and take any appropriate remedial actions. In other embodiments, if a particular threshold amount of a registered combination of data elements is found in an object, then an event may be validated.

For purposes of illustrating the techniques of data combination protection system 10, it is important to understand the activities and security concerns that may be present in a given network such as the network shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

A challenge in many security environments is the ability to control confidential electronic data. In one example security issue, many organizations collect and store data that can be used to identify individuals who may be associated with the organization or may simply be members of the general public or various segments thereof. This sensitive data may include, for example, name, social security number, credit card number, address, telephone number, date of birth, citizenship, account number, employer, marital status, and the like. A sensitive data element alone in an object, or even a small number of sensitive data elements in an object, may not be sufficiently distinctive to identify a particular person or to reveal confidential information. As the number of sensitive data elements associated with a particular person increases within an object, however, the possibility of the person becoming identifiable also increases and, therefore, the risk of exposing related confidential information increases. Similarly, other types of confidential information may also become identifiable as the number of associated data elements related to the confidential information increases (e.g., data elements related to intellectual property, corporate financial data, confidential government information, etc.).

Various federal and state laws also regulate the disclosure of individuals' nonpublic personal information and personally identifiable information by certain organizations or entities. For example, the Health Insurance Portability and Accountability Act of 1996 (HIPAA) regulates the use and disclosure of protected health information (PHI) if the information is individually identifiable (i.e., containing information such as name, address, date of birth, social security number, or other information that could be used to identify a particular person). Similarly, the Gramm-Leach-Bliley Act of 1999 (GLBA) seeks to protect individuals' personal financial information by regulating the disclosure of non-public personal information by financial institutions. In another example, the Payment Card Industry (PCI) Data Security Standard also regulates the use and disclosure of data elements on payment cards. Such regulations may proscribe unauthorized dissemination of electronic data containing predetermined combinations of data elements (e.g., name, social security number, and date of birth) that could potentially identify particular individuals and their personal information.

Monitoring objects for sensitive data elements can be problematic for several reasons. First, the volume of data maintained in some networks requires sophisticated processing techniques to minimize network performance degradation. With roughly 300 million people in the United States alone, the number of data elements related to just those individuals could quickly increase to billions of data elements. Standard computer memory and processing capabilities need to be optimized in order to efficiently process objects to register and evaluate billions of data elements.

Another monitoring problem occurs because certain data is not always presented in a standard format. For example, numerous formats can be used for a date of birth (e.g., 'Jun. 25, 1964', 'Jun. 25, 1964', '1964.May.25', etc.) or a telephone number (e.g., '(000) 000-0000', '000-000-0000', '000.000.0000', etc.). In one example scenario, data elements may be stored in a network in one format, and then disclosed in an object in a different format. Regulations and resulting penalties for an unauthorized data disclosure, however, may apply to a disclosure of confidential information regardless of the format used in the disclosure. Thus, detecting sensitive data elements in objects requires recognizing varying formats of particular data.

The multitude of formats in which electronic data can be shared electronically may also hinder security systems from successfully monitoring electronic disclosures of confidential information. Electronic data can be provided in numerous configurations (e.g., spreadsheets with predefined columns and rows, email messages, word processing documents, databases, transmitted objects formatted using a defined protocol, etc.). Consequently, in a system in which specified combinations of data elements are being monitored, such elements may not necessarily be located in close proximity to other associated data elements of the same specified combination. The data elements in a particular specified combination could be separated by words, formatting characters, lines, or any separator or delimiter within an object. Sophisticated techniques are needed to evaluate and validate objects containing specified combinations of data elements, regardless of where such data elements appear within the object.

A system for protecting specified data combinations outlined by FIG. 1 can resolve many of these issues. In accordance with one example implementation of data combination protection system 10, registration system 22 is provided in network 100 to create a registration list of specified combinations or sets of data elements to be monitored. The registration system can recognize and register data elements presented in various character formats or patterns and provided in various electronic file formats having a predefined delimiter between each set of data elements. Multiple detection systems 24, 26, and 28 may also be provided to evaluate captured and/or stored objects in the network environment to determine which objects contain one or more of the registered sets of data elements. The detection systems may be configured to recognize data elements within an object and to determine whether each data element of a registered combination of data elements is contained somewhere within the confines of the object. The registration list may be indexed and searched by the detection system in a manner that optimizes computer resources and that minimizes any network performance issues.

Note that in this Specification, references to various features (e.g., elements, structures, modules, components, steps, etc.) included in "one embodiment", "example embodiment", "an embodiment", "another embodiment", "some embodiments", "various embodiments", "other embodiments", "alternative embodiment", and the like are intended to mean that any such features may be included in one or more embodiments of the present disclosure, but may or may not necessarily be included in the same embodiments.

Turning to the infrastructure of FIG. 1, data combination protection system 10 may be implemented in exemplary network 100, which may be configured as a local area network (LAN) and implemented using various wired configurations (e.g., Ethernet) and/or wireless technologies (e.g., IEEE 802.11x). In one embodiment, network 100 may be operably coupled to Internet 180 by an Internet Service Provider (ISP) or through an Internet Server with dedicated bandwidth. Network 100 could also be connected to other logically distinct networks configured as LANs or any other suitable network type. Furthermore, network 100 could be replaced with any other type of network where appropriate and according to particular needs. Such networks include a wireless LAN (WLAN), a metropolitan area network (MAN), a wide area network (WAN), a virtual private network (VPN), or any other appropriate architecture or system that facilitates communications in a network environment. The connection to Internet 180 and other logically distinct networks may include any appropriate medium such as, for example, digital subscriber lines (DSL), telephone lines, T1 lines, T3 lines, wireless, satellite, fiber optics, cable, Ethernet, etc. or any combination thereof. Numerous networking components such as gateways, routers, switches (e.g., 172), and the like may be used to facilitate electronic communication within network 100 and between network 100, Internet 180, and any other logically distinct networks linked to network 100.

Network 100 may be configured to permit transmission control protocol/internet protocol (TCP/IP) communications for the transmission or reception of electronic packets. Network 100 may also operate in conjunction with a user datagram protocol/IP (UDP/IP) or any other suitable protocol where appropriate and based on particular needs. In addition, email gateway 162 may allow client computers such as client device 130, which is operably connected to network 100, to send and receive email messages using Simple Mail Transfer Protocol (SMTP) or any other suitable protocol.

Client device 130 represents one or more endpoints or customers wishing to affect or otherwise manage electronic communications in network 100. The term 'client device' may be inclusive of devices used to initiate an electronic communication, such as a computer, a personal digital assistant (PDA), a laptop or electronic notebook, a cellular telephone, or any other device, component, element, or object capable of initiating voice, audio, or data exchanges within network 100. The endpoints may also be inclusive of a suitable interface to a human user, such as a microphone, a display, or a keyboard or other terminal equipment. The endpoints may also be any device that seeks to initiate an electronic communication on behalf of another entity or element, such as a program, a database, or any other component, device, element, or object capable of initiating a voice or a data exchange within network 100.

Network appliances having registration and detection systems can provide a data combination protection system 10 in network 100 that enables protection against inadvertent or intentional information leaking, in which particular combinations of leaked data can potentially expose confidential information. These network appliances may be able to access communication pathways associated with the network configuration, such that one or more appliances have access to e-mail traffic, other network traffic, or data that is simply residing somewhere in the business infrastructure (e.g., on a server, a repository, etc.). In particular, network appliance 12 with registration system 22 can be deployed in network 100 for access to databases and repositories 112 containing sensitive data elements. Registration system 22 can register specific combinations of data from databases and repositories 112, or from other files or objects in a suitable format. The registered combinations of data can be used by detection systems 24, 26, and 28 of network appliances 14, 16, and 18 to detect leaks of any complete registered data combination, or a predetermined portion thereof, in network traffic or to detect the presence of such data combinations, or predetermined portions thereof, residing in an unauthorized segment of the business infrastructure.

Network appliances 14, 16, and 18 with detection systems 24, 26, and 18 can be deployed at network egress points (e.g., email gateway 162, web gateway 164, switch 172, etc.) to protect internal-to-external and internal-to-internal network traffic. When a network appliance detects a risk event, it can alert an administrator, which can leverage existing infrastructure to block or quarantine sensitive information from leaving the network. As a device deployed using passive interception techniques, such as a network tap or in traffic mirroring, the network appliances can operate non-disruptively, requiring no changes to applications, servers, workstations, or the network itself. The network appliances can monitor and analyze all applications, protocols, and content types and trigger enforcement actions in real time.

Data protection manager 32 in network appliance 30 illustrated in FIG. 1 may be designed to simplify administration of data combination protection system 10 as it can offer a centralized interface to manage registration system 22 and all detection systems 24, 26, and 28 across multiple network appliances. Data protection manager 32 may be configured to centrally maintain data generated from registration system 22 and detection systems 24, 26, and 28 and to coordinate data flow between the distributed registration and detection systems, which can reside in various network appliances as shown in FIG. 1. In particular, one embodiment includes a registration list and an index to the registration list created by registration system 22, which can be distributed by data protection manager 32 to each of the distributed detection systems 24, 26, and 28.

Data protection manager 32 may also be configured to allow an authorized security professional (e.g., IT administrator, network operator, etc.) to determine what data input is provided to registration system 22 including which databases or other repositories registration system 22 crawls for data input, to designate enforcement or monitoring states associated with individual detection systems, and to designate who can access the corresponding findings. Enforcement actions can include alerting an appropriate administrator, directing an enforcement device to block or quarantine the suspect traffic, and/or reporting on the traffic. Monitoring actions can include alerting an appropriate administrator and/or reporting on the suspect traffic, without blocking or quarantining actions.

Data protection manager 32 may also provide a centralized query mechanism, which allows organizations to quickly search through capture databases contained on multiple distributed network appliances simultaneously. By allowing the administrator a unified view over all historical data captured throughout points in the network where network appliances are deployed, organizations can quickly perform forensic analysis, conduct investigations, and leverage captured data to update security posture to safeguard sensitive information or to handle emerging threats. In addition, the data protection manager may provide unified reports and diagnostic information.

One or more tables and lists may be included in these network appliances. In some embodiments, these tables and lists may be provided externally to these elements, or consolidated in any suitable fashion. The tables and lists are memory elements for storing information to be referenced by their corresponding network appliances. As used herein in this document, the term 'table' and 'list' is inclusive of any suitable database or storage medium (provided in any appropriate format) that is capable of maintaining information pertinent to the operations detailed herein in this Specification. For example, the tables and lists may store information in an electronic register, diagram, record, index, or queue. The tables and lists may keep such information in any suitable random access memory (RAM), read only memory (ROM), erasable programmable ROM (EPROM), electronically erasable PROM (EEPROM), application specific integrated circuit (ASIC), software, hardware, or in any other suitable component, device, element, or object where appropriate and based on particular needs.

A capture system 29 may also be a part of (or coupled to) one or more network appliances, such as network appliance 18, and may be operably connected to a corresponding capture database 118. In one example embodiment, capture system 29 may be the capture system as shown and described in co-pending U.S. patent application Ser. No. 12/358,399, filed Jan. 23, 2009, entitled "SYSTEM AND METHOD FOR INTELLIGENT STATE MANAGEMENT," by William Deninger et al., which was previously incorporated by reference herein in its entirety. Capture system 29 may be configured to intercept data leaving a network, such as network 100, or being communicated internally to a network such as network 100. Capture system 29 can reconstruct objects (e.g., files or other documents) leaving the network or being communicated internally, and store the reconstructed objects in a searchable manner in, for example, capture database 118.

In some embodiments, capture system 29 may also be implemented in conjunction with the other various detection systems 24 and 26 of network 100 for capturing data from the corresponding egress points (e.g., email gateway 162 and web gateway 164). Capture system 29 may also be implemented in conjunction with detection systems in other associated but logically and/or geographically distinct networks. These capture systems may be included within a network appliance with a detection system as shown in FIG. 1, or provided as a separate component. In other embodiments, any other suitable form of intercepting network traffic may be used to provide detection systems 24, 26, and 28 with internal and outbound network traffic of network 100 to be analyzed.

In FIG. 1, switch 172 is connected to network appliance 18 and to Internet 180 through firewall 174. Switch 172, which may be implemented as a router or other network device capable of interconnecting network components, can transmit an outgoing data stream to Internet 180 and a copy of that stream to capture system 29. Switch 172 may also send incoming data to capture system 29 and to network 100. In alternative embodiments, capture system 29, registration system 22, detection systems 24, 26, and 28, and data protection manager 30 may be included as part of other network devices such as switches, routers, gateways, bridges, loadbalancers, servers, or any other suitable device, component, or element operable to exchange information in a network environment.

Data combination protection system 10 is also scalable as distributed networks can include additional detection systems for protecting data leakage across distributed network segments (e.g., having separate access points, being geographically dispersed, etc.) of a network infrastructure. Data protection manager 32 may continue to coordinate data flow between registration system 22 and detection systems 24, 26, and 28 in addition to detection systems provided in distributed segments of network 100.

Figure 2:
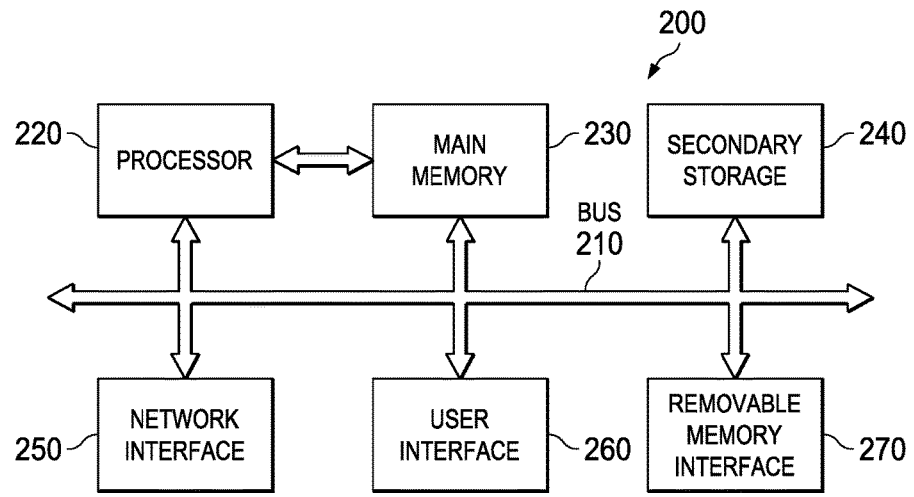
FIG. 2 is a simplified block diagram of a computer, which may be utilized in embodiments of the data combination protection system in accordance with the present disclosure.

Turning to FIG. 2, FIG. 2 is a simplified block diagram of a general or special purpose computer 200, such as network appliances 12, 14, 16, 18, and 30 or other computing devices, connected to network 100. Computer 200 may include various components such as a processor 220, a main memory 230, a secondary storage 240, a network interface 250, a user interface 260, and a removable memory interface 270. A bus 210, such as a system bus, may provide electronic communication between processor 210 and the other components, memory, and interfaces of computer 200.

Processor 220, which may also be referred to as a central processing unit (CPU), can include any general or special-purpose processor capable of executing machine readable instructions and performing operations on data as instructed by the machine readable instructions. Main memory 230 may be directly accessible to processor 220 for accessing machine instructions and can be in the form of random access memory (RAM) or any type of dynamic storage (e.g., dynamic random access memory (DRAM)). Secondary storage 240 can be any non-volatile memory such as a hard disk, which is capable of storing electronic data including executable software files. Externally stored electronic data may be provided to computer 200 through removable memory interface 270. Removable memory interface 270 represents a connection to any type of external memory such as compact discs (CDs), digital video discs (DVDs), flash drives, external hard drives, or any other external media.

Network interface 250 can be any network interface controller (NIC) that provides a suitable network connection between computer 200 and any network elements (e.g., email gateway 162, web gateway 164, switch 172, databases and repositories 118 and 112, other network appliances, etc.) and networks to which computer 200 connects for sending and receiving electronic data. For example, network interface 250 could be an Ethernet adapter, a token ring adapter, or a wireless adapter. A user interface 260 may be provided to allow a user to interact with the computer 200 via any suitable means, including a graphical user interface display. In addition, any appropriate input mechanism may also be included such as a keyboard, mouse, voice recognition, touch pad, input screen, etc.

Not shown in FIG. 2 is additional hardware that may be suitably coupled to processor 220 and bus 210 in the form of memory management units (MMU), additional symmetric multiprocessing (SMP) elements, read only memory (ROM), erasable programmable ROM (EPROM), electronically erasable PROM (EEPROM), peripheral component interconnect (PCI) bus and corresponding bridges, small computer system interface (SCSI)/integrated drive electronics (IDE) elements, etc. Any suitable operating systems may also be configured in computer 200 to appropriately manage the operation of hardware components therein. Moreover, these computers may include any other suitable hardware, software, components, modules, interfaces, or objects that facilitate the operations thereof. This may be inclusive of appropriate algorithms and communication protocols that facilitate the registration and detection operations detailed herein.

These elements, shown and/or described with reference to computer 200, are intended for illustrative purposes and are not meant to imply architectural limitations of computers such as network appliances 12, 14, 16, 18, and 30, utilized in accordance with the present disclosure. In addition, each computer, including network appliances 12, 14, 16, 18, and 30, may include more or less components where appropriate and based on particular requirements. As used herein in this Specification, the term 'computer' is meant to encompass any personal computers, network appliances, routers, switches, gateways, processors, servers, load balancers, firewalls, or any other suitable device, component, element, or object operable to affect or process electronic information in a network environment.

Registration System

Figure 3:
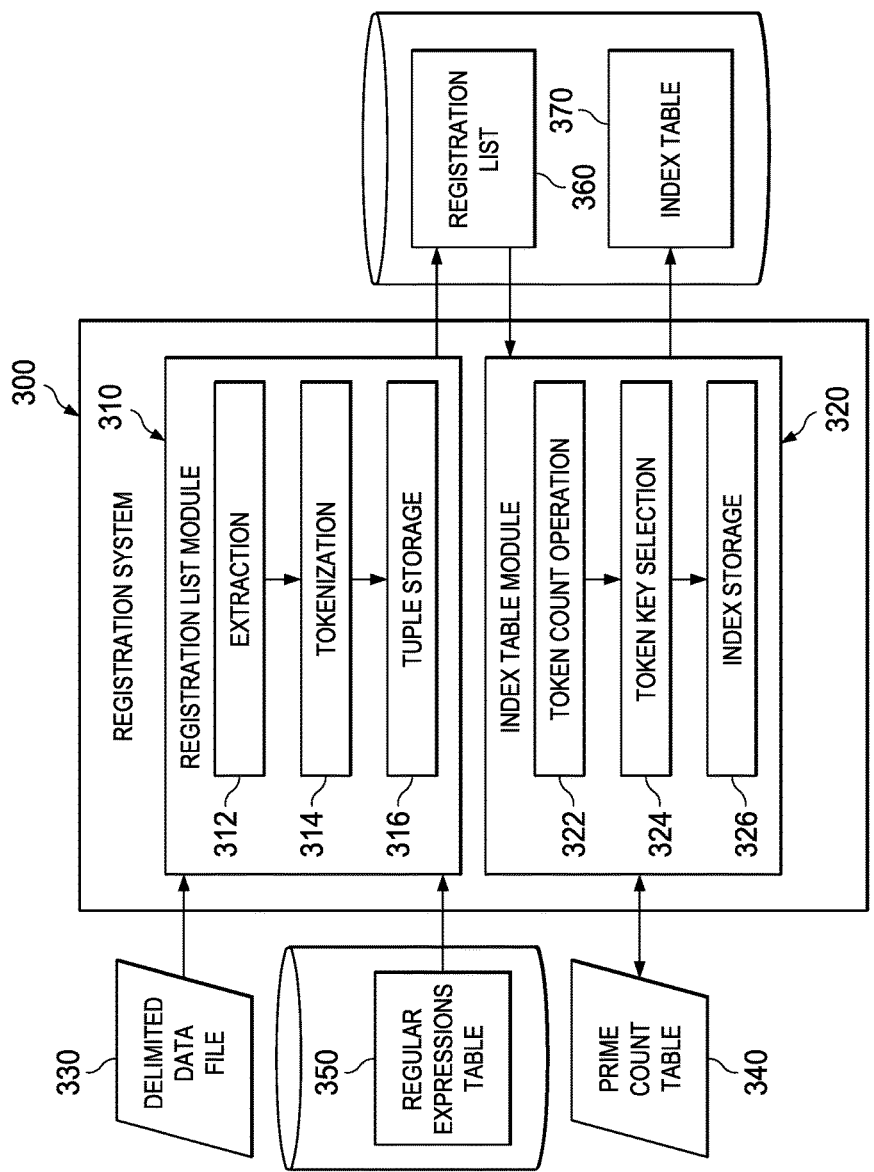
FIG. 3 is a block diagram of a registration system in the data combination protection system in accordance with one embodiment of the present disclosure.

Turning to FIG. 3, a simplified block diagram of one embodiment of a registration system 300 is shown. Registration system 300 can include a registration list module 310 and an index table module 320. Input to registration list module 310 can include a delimited data file 330 and a regular expressions table 350 and output of registration list module 310 can include a registration list 360. In one embodiment, delimited data file 330 may represent a plurality of delimited data files generated for various databases and/or files in a network and provided as input to registration list module 310. These delimited data files include specified combinations or sets of data elements to be registered by registration system 300.

Registration list module 310 may perform the functions of extraction 312, tokenization 314, and tuple storage 316. In one embodiment, delimited data file 330 includes a plurality of records delimited by a predefined delimiter such as, for example, a carriage return. Each record may include one or more data elements, which are extracted by extraction function 312. The set of data elements within a record can be a specified combination of related data elements (e.g., a name, a phone number, a social security number, an account number, etc.) that requires safeguarding. Each of the data elements of a record are tokenized by tokenization function 314 into a token (e.g., a numerical representation), which can then be stored in a tuple or record of registration list 360 by tuple storage function 316. Thus, a tuple in registration list 360 may include numerical representations or tokens of each data element in one particular combination of related data elements that is sought to be protected.

The data elements extracted and tokenized from delimited data file 330 can include words and/or expression elements, which can have multiple possible formats (e.g., phone number, date of birth, account number, etc.). A data element can be compared to regular expressions table 350 to determine whether the particular character pattern of the data element matches a predefined expression pattern (i.e., a regular expression), as described in U.S. patent application Ser. No. 12/358,399, filed Jan. 23, 2009, entitled "SYSTEM AND METHOD FOR INTELLIGENT STATE MANAGEMENT," which has been previously incorporated herein by reference in its entirety. Although data combination protection system 10 could be configured to use a regular expression table as shown and described in U.S. patent application Ser. No. 12/358,399, it will be apparent that regular expressions table 350 used by data combination protection system 10 may be configured in numerous other ways, as long as the table 350 includes the predefined expression patterns.

In one embodiment, regular expressions table 350 includes numerous expression patterns, including a plurality of expression patterns for the same concept. For example, a telephone number concept could include the following regular expression patterns: '(nnn) nnn-nnnn', 'nnn-nnn-nnnn', and 'nnn.nnn.nnnn' with 'n' representing numbers 0-9. Similarly, different states use different sequences of characters and separators for driver's license numbers. Thus, a driver's license concept could include a regular expression pattern for each unique sequence of characters and separators representing possible numbers of a driver's license in different states. For example, 'dnnn-nnnn-nnnn-nn', and 'dnnnn-nnnn-nnnn' could be expression patterns for license numbers in Wisconsin and Illinois, with 'n' representing numbers 0-9 and 'd' representing letters A-Z.

Expression patterns in regular expression table 350 may be user-configurable through an interface that allows a user to define expression patterns for a particular concept. In addition, some expression patterns may be automatically generated or may be preconfigured in data combination protection system 10. For example, a list of common or popular regular expression patterns can be preconfigured in regular expressions table 350 that may be tailored specifically to the industry into which the data combination protection system 10 is sold.

Index table module 320 may perform the functions of token count operation 322, token key selection 324, and index storage 326 to create index table 370. Token count operation function 322 processes registration list 360 to count all of the occurrences of each token in registration list 360. A temporary prime count table 340 may be created to store the count sums. Token key selection function 324 can then process each tuple and, using prime count table 340, select the least frequently occurring one of the tokens from each tuple as a token key. Each unique token key may then be stored in an index of index table 370. Thus, index table 370 can contain a plurality of indexes, each having a unique token key and each being associated with one or more tuples of registration list 360.

Figure 4:
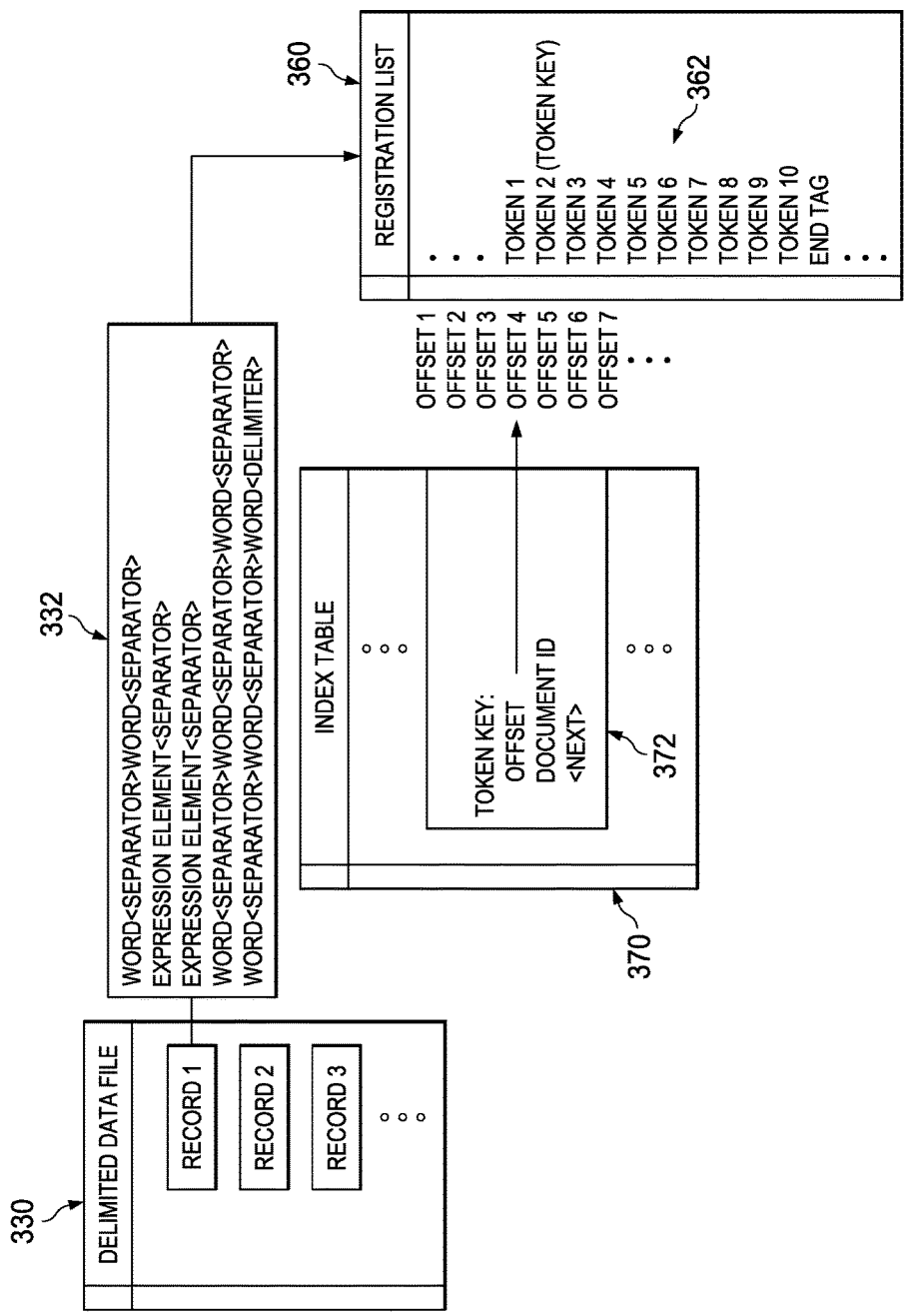
FIG. 4 is a block diagram of various data file structures in the data combination protection system in accordance with one embodiment of the present disclosure.

FIG. 4 provides a more detailed illustration of exemplary file structures of delimited data file 330 with an example record 1, registration list 360 with an example tuple 362, and index table 370 with an example index 372. Delimited data file 330 is shown with a detailed first record 332 illustrating a possible configuration of record 1 with an example combination of data elements types (i.e., words and expression elements). First record 332 corresponds to tuple 362 of registration list 360, where each word and expression element from first record 332 corresponds to one token in tuple 362. Tuple 362 is indexed in registration list 360 by index 372 of index table 370, which includes a registration list offset that is a pointer (i.e., offset 4) to the beginning (i.e., token 1) of tuple 362.

In one example embodiment, delimited data file 330 may be configured as a file with a plurality of records (e.g., record 1, record 2, record 3, etc.) having a predefined delimiter between each record. A delimiter can be any formatting character or other character used to designate the end of one record and the beginning of a next record. Some common delimiters include carriage returns, line feeds, semi-colons, and periods. However, any character could be designated as a delimiter if the data file is appropriately configured with the particular delimiter. In one example embodiment, if a carriage return is defined as the delimiter for delimited data file 330, then each record would end with a carriage return.

As shown in expanded first record 332, each record may be comprised of a plurality of data elements (i.e., words or expression elements). The data elements within each record of delimited data file 330 are separated by at least one separator (e.g., comma, space, dash, etc.). A word may be comprised of a string of characters having one or more consecutive essential characters without any separators. An expression element may be comprised of a string of characters having at least two words and one or more separators between the words. In one embodiment, essential characters can include a fundamental unit in a written language including numerical digits, letters of a written language, and/or symbols representing speech segments of a written language (e.g., syllabograms, etc.). Speech segments of a language can include words, syllables of words, distinct sounds, phrases, and the like.

Separators can include any character that is not an essential character and that is not recognized as a predefined delimiter indicating an end of a record in the data file. Examples of separators include punctuation marks, word dividers and other symbols indicating the structure and organization of a written language (e.g., dashes, forward slashes, backward slashes, left parentheticals, right parentheticals, left brackets, right brackets, periods, spaces, an at symbol, an ampersand symbol, a star symbol, a pound symbol, a dollar sign symbol, a percent sign symbol, a quote, a carriage return, a line feed, etc.). In some data file configurations, separators can include characters that are equivalent to the predefined delimiter for the data file. However, in such data files, the equivalent character within a record must be differentiated from the predefined delimiter that indicates an end of the record. Thus, the equivalent character within the record would be processed either as a separator between data elements or as a separator included within an expression element.

In an example embodiment, delimited data file 330 is a comma separated variable (CSV) list, which can be a text format generated for a database or other file having a tabular data format. A CSV list can include multiple data elements in each record with the data elements being separated by commas. Each record in the CSV list includes a character designated as a predefined delimiter to indicate an end of the record, such as a carriage return or line feed. These predefined delimiters conform to Request for Comments (RFC) 4180, in which carriage returns and line feeds within a record are encapsulated in quotes or appropriately escaped in order to differentiate them from a predefined delimiter indicating an end of record. Additionally, in CSV lists, quotes may also be used as separators between data elements or within an expression element if appropriately escaped (i.e., an empty set of quotes to indicate a literal quote).

Generally, for a database or other file having a tabular data format, each CSV record includes the same number of data elements. Embodiments of registration system 300, however, can accommodate varying numbers of data elements in each record, because each record is delineated by a predefined delimiter that is recognized by system 300. Moreover, registration system 300 can also accommodate other formats of delimited data file 330 as long as each record (containing a desired combination of data elements) is delineated by a predefined delimiter, which is designated for the data file 330 and recognized by registration system 300. For example, a free form textual document, in which a variety of separators (e.g., spaces, dashes, etc.) separate data elements, may be provided as a delimited data file if a predefined delimiter (e.g., line feed, carriage return, period, etc.) is used to separate successive pairs of records and is designated as the delimiter for the data file such that it is recognized by registration system 300.

In the example first record 332 of FIG. 4, ten data elements are shown, including 2 words, 2 expression elements, and 6 words in succession. A separator is provided between each of the successive data elements and a delimiter is provided at the end of first record 332. After a data element has been identified and extracted from first record 332 by registration list module 310 of registration system 300, the data element may be tokenized into one token (e.g., token 1 through token 10) and stored in tuple 362 of registration list 360. An end tag may also be provided to denote the end of a tuple in registration list 360. Registration list module 310 can process each record of delimited data file 330 and create a separate tuple in registration list 360 corresponding to each record.

Once registration list 360 is complete with tuples corresponding to each record of delimited data file 330, index table module 320 may process registration list 360 to create index table 370. In the example shown in FIG. 4, index table module 320 generates index 372 to provide an index for locating tuple 362 in registration list 360. Prime count table 340, which stores the sums of occurrences for each token in registration list 360, can be generated. A token key for tuple 362 can then be computed by searching prime count table 340 to find a token from tuple 362 that appears with the least frequency in the entire registration list 360, relative to the other tokens in tuple 362. In this example illustration, token 2 is shown as the token occurring with the least frequency (i.e., the lowest sum of occurrences), compared to the sums of occurrences of token 1 and tokens 3-10. Thus, token 2 may be selected as the token key and used to create index 372.

In one embodiment, index table 370 can be generated using a known technique of forcing hash numbers (e.g., token keys) into a narrow boundary with modulus, in which the boundary is defined by a prime number. This can be advantageous for particularly large amounts of data, where a smaller area of memory may be allocated to accommodate the data and the data is generally distributed uniformly within the allocated memory. Thus, extremely large amounts of data can be more efficiently processed. The size of index table 370 could be generated by, for example, data protection manager 32 of system 10, based on resources selected by an authorized user during resource provisioning of system 10. Once the memory is allocated, each index can be placed in a space within index table 370 corresponding to a value (e.g., a remainder) calculated by performing a modulo operation on the token key with the prime number size of the index table. If statistical collisions occur (i.e., different token keys have the same result from a modulo operation), then the different token keys can be link-listed in the same space of index table 370.

A registration list offset, which points to a beginning of tuple 362 (e.g., offset 4 pointing to token 1) may be added to index 372 and associated with the token key. In addition, a document identifier ("document ID" or "docID"), which can identify delimited data file 330 may also be added to index 372 and associated with the token key. Thus, when multiple delimited data files are used to create registration list 360, the document ID field in an index identifies which delimited data file is associated with the tuple to which the accompanying registration list offset points. In addition, if two or more token keys are link-listed in a space within index table 370, then the offsets and document IDs corresponding to a particular token key are associated with that particular token key in the index.

The <NEXT> field of index 372 represents additional registration list offsets and document IDs that may be associated with the same token key in index 372. For example, a second tuple having a second offset in registration list 360 may also contain token 2. If token 2 is the token in the second tuple that occurs with the least frequency in the registration list 360 relative to the other tokens in the second tuple, then token 2 of the second tuple could be selected as the token key for the second tuple. Thus, the same index 372 could be used to designate the second tuple by adding a second registration list offset and an appropriate document ID after the <NEXT> pointer.

Figure 5:
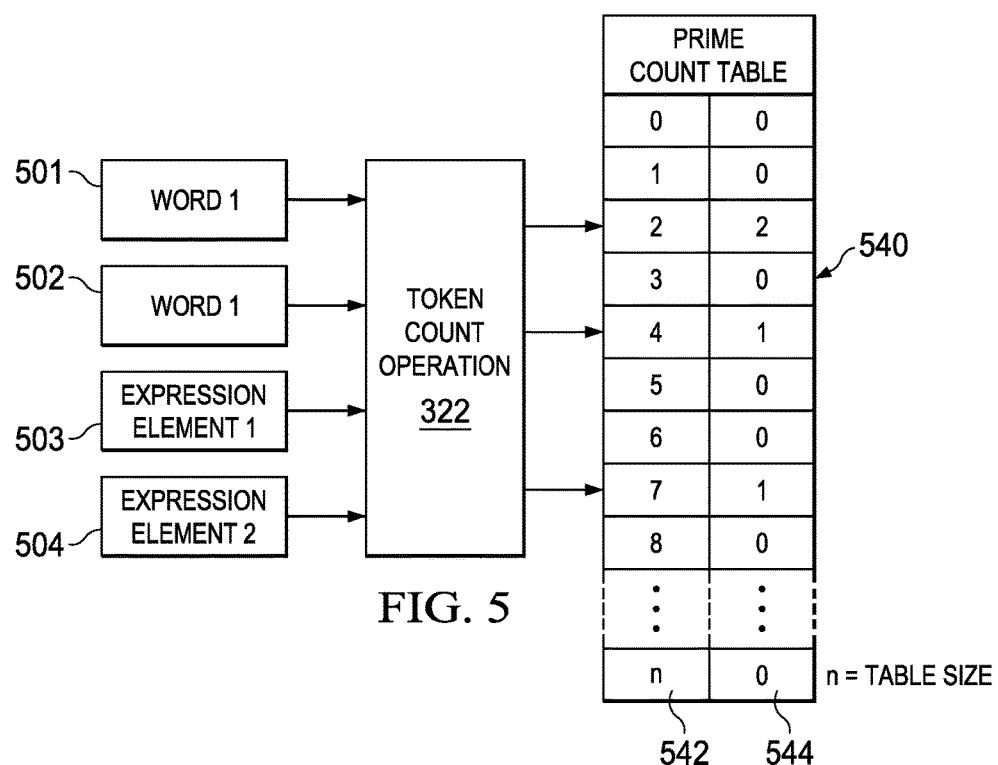
FIG. 5 is a simplified block diagram with example data input and output in accordance with one aspect of the registration system of the present disclosure.

Turning to FIG. 5, FIG. 5 is a simplified block diagram illustrating example data input and a resulting prime count table 540, which may be generated by token count operation 322 of index table module 320. Data element 501 (word 1), data element 502 (word 1), data element 503 (expression element 1), and data element 504 (expression element 2) represent example data elements of a delimited data file, such as delimited data file 330, which are stored as tokens in one or more tuples of a registration list such as registration list 360. Token count operation function 322 may count the tokens generated for each of the data elements 501, 502, 503, and 504 and may produce prime count table 540. In one embodiment, prime count table 540 may include 'n' entries 542 with corresponding token sums 544. In this example, 'n' is equal to a prime number and a modulo operation is performed on each token to determine which entry corresponds to the token sum to be incremented. Thus, in this example, entry 2 corresponds to tokens representing data element 501 (word 1) and data element 502 (word 1) and, therefore, has a token sum of 2. In addition, entries 4 and 7 correspond to tokens representing data element 503 (expression element 1) and data element 504 (expression element 2), respectively, and each has a token sum of 1.

Figure 6A:
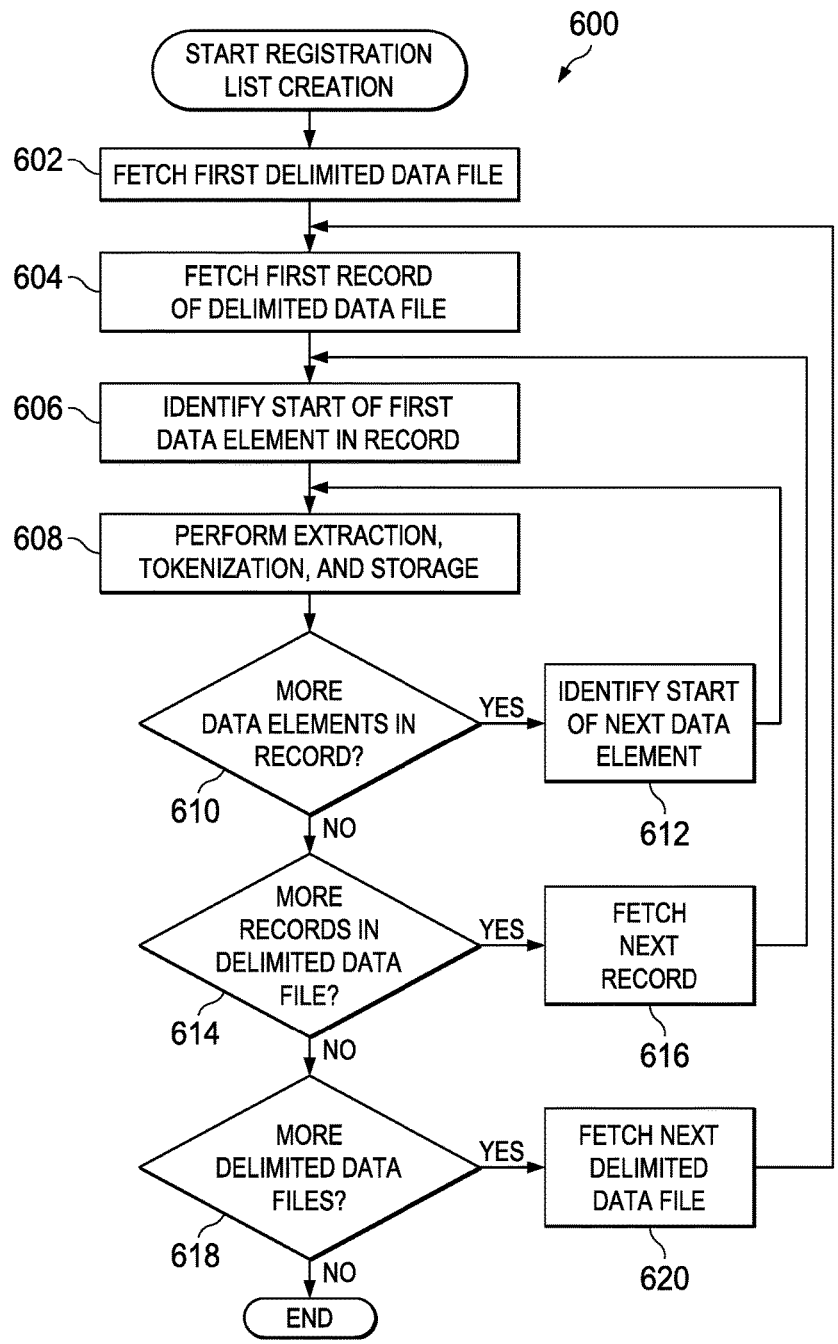
FIGS. 6A, 6B, and 7 are simplified flowcharts illustrating a series of example steps associated with the registration system.
Figure 6B:
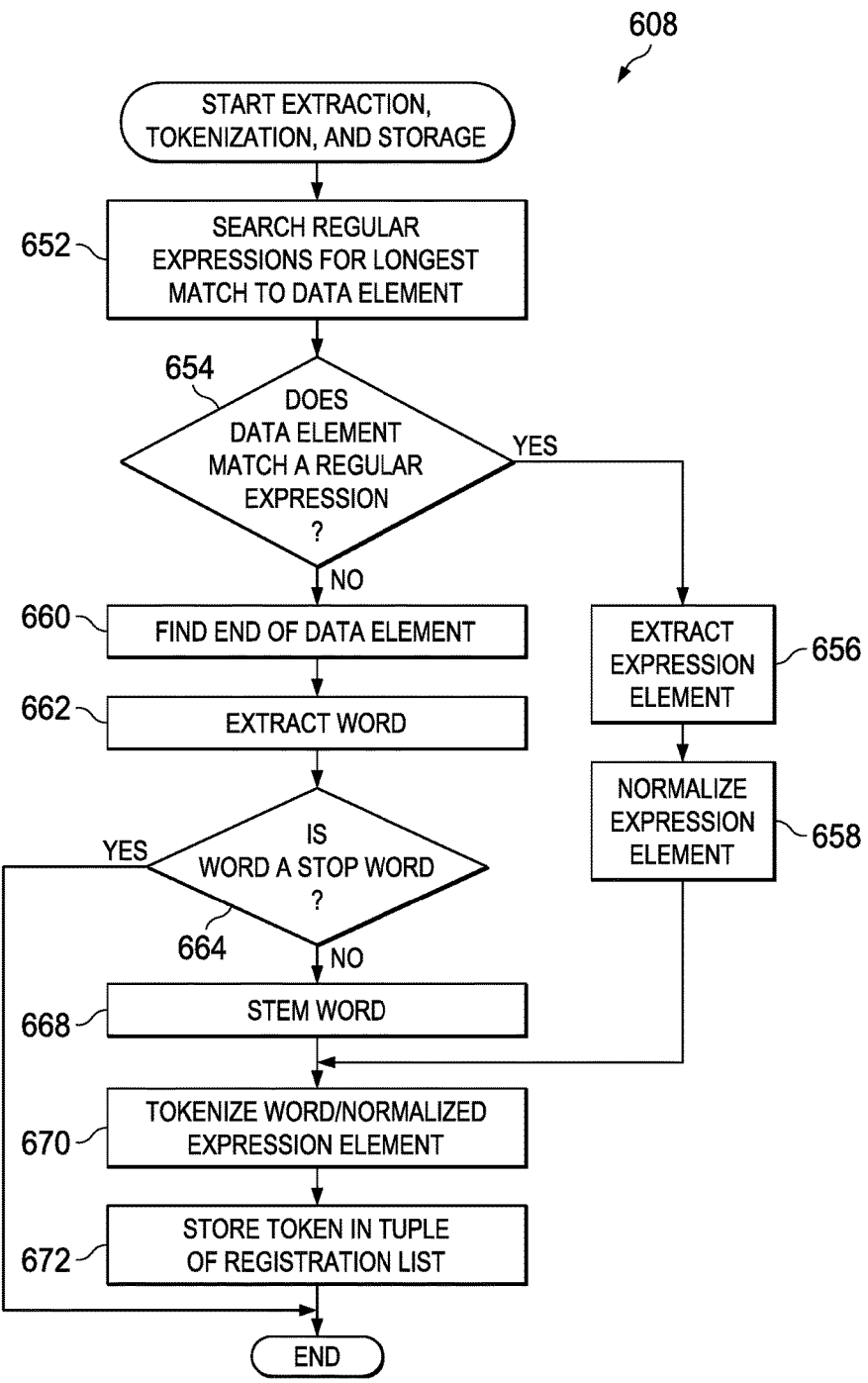
Figure 7:
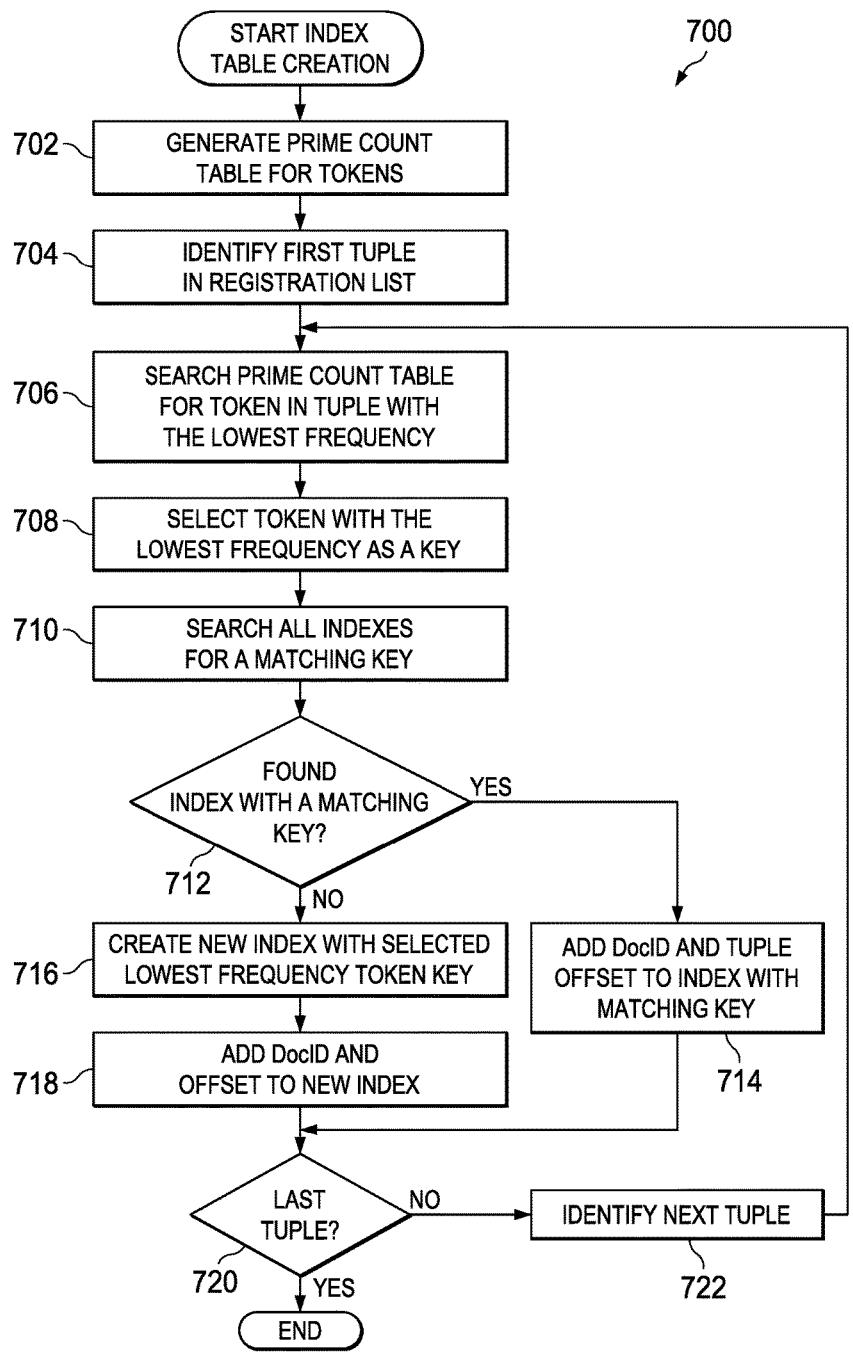

Turning to FIGS. 6A, 6B, and 7, simplified flowcharts illustrate operational processing of registration system 300. FIGS. 6A and 6B are simplified flowcharts illustrating example operational steps for registration list module 310 of registration system 300. FIG. 7 is a simplified flowchart illustrating example operational steps for index table module 320 of registration system 300.

FIG. 6A shows the overall flow 600 of registration list module 310, including the processing of one or more delimited data files, the processing of each record of each delimited data file, and the processing of each data element in each record of the one or more delimited data files. Flow may begin in step 602 of FIG. 6A, where a first delimited data file is obtained. In one embodiment, registration system 300 can be configured to crawl one or more desired databases or other data files and convert the databases or other data files to one or more delimited data files. As previously discussed herein, in one example, a database or other data file could be converted to a comma separated variable list (CSV), which could be provided as the delimited data file.

Once the delimited data file is obtained, a first record is fetched in step 604. In step 606 a start of a first data element is identified in the fetched record. In step 608, applicable extraction, tokenization, and storage operations are performed on the current data element, which will be described in more detail herein with reference to FIG. 6B. After applicable extraction, tokenization, and storage operations have been performed for the current data element, flow moves to decision box 610 to determine whether more data elements exist in the record. If more data elements exist in the record, then a start of a next data element in the record is identified in step 612. Flow then loops back to step 608 to perform extraction, tokenization, and storage on the new data element.

With reference again to decision box 610, if a predefined delimiter is recognized in the record after the current data element, then it is determined that no more data elements exist in the record. Flow may then move to decision box 614 to determine whether there are more records in delimited data file. If more records exist in the delimited data file, then a next record is fetched in step 616 and flow loops back to step 606 to identify a start of a first data element in the new record.

If it is determined that no more records exist in delimited data file in decision box 614, however, then flow passes to decision box 618 to determine whether there are more delimited data files to be processed. If it is determined that one or more delimited data files exist that have not been processed, then a next delimited data file is obtained in step 620 and flow loops back to step 604 and a first record is fetched from the new delimited data file. However, if it is determined in decision box 618 that all delimited data files have been processed, then the flow ends.

FIG. 6B shows the overall flow of step 608 in FIG. 6A, illustrating example operational steps to extract, tokenize, and store a data element from a record of a delimited data file. Flow may begin in step 652 where regular expression table 350 is searched to find a longest match to a character pattern of a string of characters beginning at the start of the data element. In one embodiment, expression patterns from regular expression table 350 are compared in order of size from longest to shortest to determine if there is a match. In decision box 654 a query is made as to whether a match from the regular expression table 350 was found.

If it is determined that none of the regular expression patterns match a character pattern of any string of characters beginning at the start of the data element (i.e., the data element does not match any regular expression patterns in regular expression table 350), then the data element represents a word and flow moves to step 660 to find an end of the data element (i.e., the word). The end of word is the last consecutive essential character beginning at the start of the data element. After the word is extracted in step 662, flow passes to decision box 664, where the word may be evaluated to determine whether it is a 'stop word'. 'Stop words' can include any words determined by an administrator or otherwise specified as a stop word, such as simple grammar construction words (e.g., like, and, but, or, is, the, an, a, as, etc.). If the word is determined to be a stop word, then it is ignored and the flow ends without tokenizing or storing the word. However, if the word is determined not to be a stop word, then flow moves to step 668 where the word may be stemmed. A stemming process such as, for example, a known porter stemming algorithm, may be applied to the word in which any suffixes and/or affixes can be extracted off of a stem of the word.

After stemming has been performed if necessary, flow may pass to step 670 where the word (or stemmed word) is tokenized. In one embodiment, tokenization includes converting the word (or stemmed word) into a 32-bit numerical representation or token. In step 672, the token is stored in a tuple of registration list 360, where the tuple corresponds to the record from which the data element was extracted. After the token has been stored, flow ends and processing continues at step 610 of FIG. 6A.

In one embodiment, the numerical representation for the token is generated using a Federal Information Processing Standards (FIPS) approved hash function. Typically, if the hash function has a lesser degree of numerical intensity, and is, therefore, a less secure hash, then less computer resources are used to calculate the hash. However, because registration list 360 may be stored in multiple places throughout a network and searched repeatedly by a plurality of detection systems as shown in FIG. 1, a greater numerical intensity may be desirable for the hash function. Thus, it may be desirable to generate more secure tokens for words and expression elements containing personal and otherwise sensitive information, even if generating such tokens requires more computer resources.

Another consideration is the size of the numerical representation used for the tokens. A 32-bit numerical value alone may not be statistically viable. That is, one word or expression element alone could generate many false positive results if one of the detection systems searches a target document or file for only one 32-bit token representing the data element. The probability of a false positive can be reduced, however, when a record includes two or more data elements that must be found in a document to validate a match. The probability of a false positive can be reduced by $2^{32}$ for each additional token that is included in a tuple and that must be found in a document to validate a match. For example, the probability of a false positive for a pair of words is $2^{64}$ and for three words is $2^{96}$. Accordingly, in one embodiment, each tuple includes at least two tokens.

Referring again to decision box 654, if it is determined that a match was found between an expression pattern of regular expression table 350 and the character pattern of a string of characters beginning at the start of the data element, then the data element represents an expression element and has the same length as the matching expression pattern. The expression element can be extracted at step 656 and normalized in step 658. In one embodiment, normalizing the expression element may include eliminating any separators from the expression element. For example, a phone number could be normalized to 'nnnnnnnnnn' with 'n' representing any number 0 through 9. In other embodiments, normalization may include modifying separators and/or particular essential characters of the expression element to achieve a predefined standard form for the expression element. For example, all dates could be standardized to the form 'YYYY-MM-DD' with 'YYYY' representing the year, 'MM' representing the month, and 'DD' representing the day.

Once the expression element has been extracted and normalized, flow may move to step 670 where the expression element is tokenized and, in step 672, the resulting token is stored in a tuple of registration list 360. After the token has been stored in registration list 360, flow returns to step 610 of FIG. 6A.

Turning to FIG. 7, FIG. 7 shows the overall flow 700 of index table module 320, which generates index table 370 with token keys and associated offsets to the corresponding tuples stored in registration list 360. To reduce the overhead of processing by detection systems 24, 26, and 28, shown in FIG. 1, each of the tuples can be indexed by a token key. In one embodiment, a token key can be a token that, compared to other tokens in the same tuple, has the lowest frequency occurrence in all tuples of the entire registration list 360. Thus, if multiple delimited data files are used to create registration list 360, a token key could be selected having the lowest frequency of all tuples created from multiple delimited data files.

In one example embodiment, a token key can be determined using a prime count table, such as prime count table 340 shown in FIG. 3, and further illustrated in an example prime count table 540 in FIG. 5. Beginning in step 702 of flow 700, prime count table 340 can be generated for the tokens stored in registration list 360 using the known technique, as previously described herein, of forcing hash numbers (e.g., tokens) into a narrow boundary with modulus, in which the boundary is defined by a prime number. Using a prime count table can alleviate computer resources needed to process data elements potentially numbering in the billions. Theoretically, the 32-bit numerical representation ($2^{32}$) could represent greater than 4 billion possible tokens. In a real-world example scenario, if an enterprise has four different entries of sensitive data for 300 million individuals, then the number of entries would exceed 1 billion. Computer resources may not be able to adequately perform processing functions if each individual entry is counted to produce index table 370. The use of prime count table 340, however, allows a smaller area of memory to be allocated and used to count the tokens in registration list 360 and select lowest frequency tokens as token keys.

In one embodiment, the size of a prime count table may be generated by, for example, data protection manager 32 of system 10, based on resources selected by an authorized user during resource provisioning of system 10. In one example scenario, for an enterprise having collected sensitive data for 300 million people, if 100 million entries are determined to be adequate to count tokens, then the size of the prime count table could be defined by the next closest prime number (e.g., 100,000,007). Thus, a table with 100,000,007 entries can be created and each of the entries cleared with a zero value.

Once memory has been allocated and defined for a prime count table, each token in registration list 360 can be processed to determine which entry to increment in prime count table 340. In one embodiment, registration list 360 may be sequentially processed from the first token in the first tuple to the last token in the last tuple. For each token, a modulo operation can be performed using the prime number and the numerical value of the particular token. The remainder value of the modulo operation is located in prime count table 340 and incremented by 1. Some statistical collisions may occur in which tokens generated for two different data elements result in the same remainder. In this case the same entry in prime count table 340 can be incremented, thus artificially increasing the number count of the entry, which corresponds to more than one token. However, an artificial increase of a word count does not significantly diminish the viability of determining the token in each tuple having the lowest frequency in the registration list.

After prime count table 340 is generated in step 702, flow passes to step 704 where a first tuple is identified in registration list 360. Steps 706 through 722 then perform looping to determine a token key for each tuple and to generate index table 370. Accordingly, the loop begins in step 706 where prime count table 340 is searched to determine which one of the tokens in the current tuple has the lowest count or frequency. In step 708, the token of the current tuple having the lowest frequency according to prime count table 340 is selected as a token key for the current tuple.

After selecting the token key for the current tuple, flow may pass to step 710 where all indexes in index table 370 can be searched for a matching token key. With reference to decision box 712, if no index is found with a token key matching the selected token key for the current tuple, then flow passes to step 716, where a new index is created in index table 370 using the selected token key. Flow then passes to step 718 where a document identifier and offset are added to the new index. In one embodiment, the document ID may be obtained from header information of the corresponding tuple in registration list 360. The offset may be a pointer or index to the corresponding tuple in registration list 360. For example, the offset can be an index number of the first token appearing in the corresponding tuple.

With reference again to decision box 712, if an index is found in index table 370 with a token key matching the selected token key for the current tuple, then an index has already been created for another tuple using the same token key. In this scenario, flow may pass to step 714 where the current tuple information can be added to the existing index. A pointer (e.g., <NEXT> pointer) can be added to the end of the existing index and then a document ID and offset corresponding to the current tuple can be added. Thus, any number of tuples having the same token key can use the same index.

After the index is created in step 718 or updated in step 714, flow passes to decision box 720 to determine whether the current tuple is the last tuple in registration list 360. If the current tuple is not the last tuple, then the next tuple is identified in step 722 and flow passes back to step 706 to begin processing the next tuple to select a token key and update index table 370. However, if it is determined in decision box 720 that the current tuple is the last tuple in registration list 360, then all tuples have been processed and flow 700 ends.

Selecting a lowest frequency token as a token key for a tuple helps improve processing efficiency during detection processing activities, which will be further described herein with reference to FIGS. 9-13. By using lowest frequency tokens as token keys in the index table, tuples in the registration list need not be compared to an object being evaluated unless the object contains a data element that, when tokenized, is equivalent to a token key in the index table. Thus, more tuples may be excluded from unnecessary processing in this embodiment than if a more commonly occurring token is selected as a token key.

Alternative embodiments could be implemented to reduce the processing required to generate the lowest frequency token keys for an index table. Although such embodiments could reduce the backend registration processing, additional processing may be required by the detection system. In one such alternative embodiment, a different token key selection criteria (i.e., other than the lowest frequency selection criteria) may be used. For example, tokens from tuples could be selected as token keys based upon a predetermined column or position of a data element in a record. Although the index table may be more quickly generated as result, more tuples may be evaluated during the detection processing, particularly if at least some of the token keys correspond to more commonly occurring data elements. Nevertheless, this embodiment may be desirable based on the particular needs of an implementation. In addition, the token key selection criteria may be user-configurable, such that an authorized user can determine the selection criteria to be used by registration system 300 when selecting the token keys.

Figure 8:
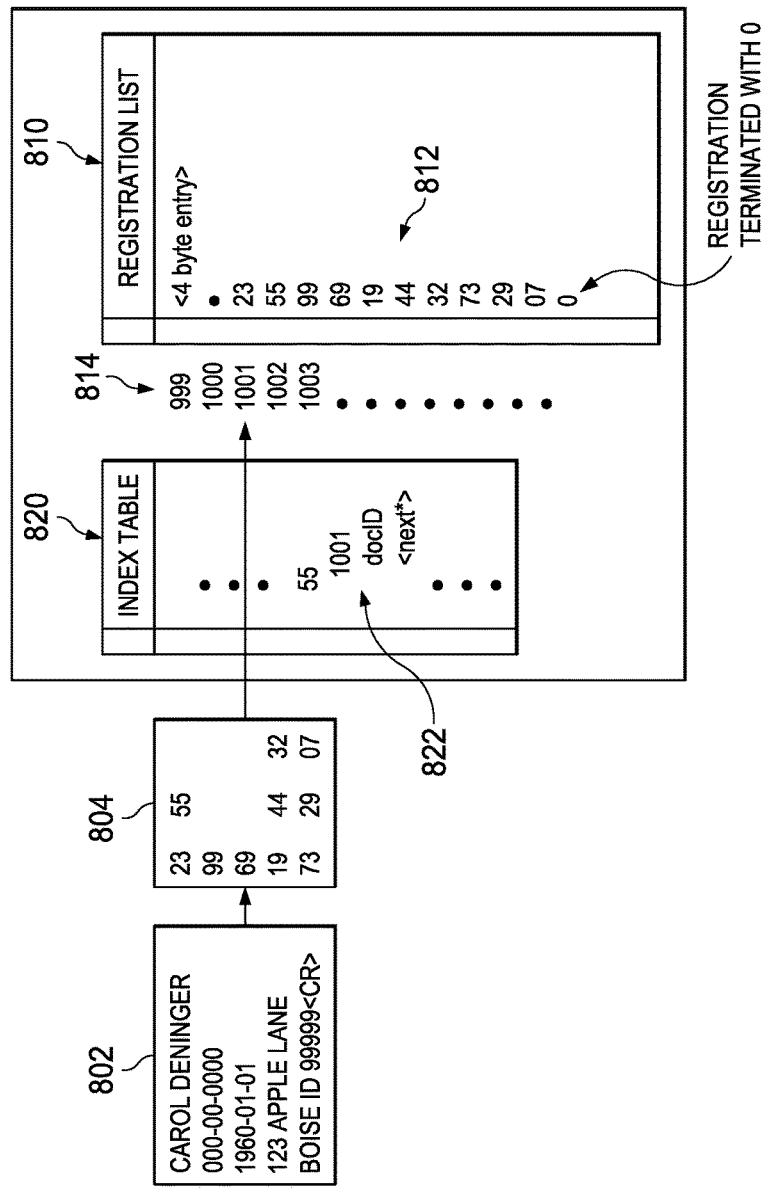
FIG. 8 illustrates file contents in an example scenario associated with the registration system processing in accordance with one embodiment of the present disclosure.

FIG. 8 illustrates a scenario in which a record 802 with example data elements is processed by registration system 300. Record 802 is an example single record of a delimited data file, such as delimited data file 330, which may have a plurality of records. Record 802 includes data elements separated by spaces and ending with a carriage return, which is the predefined delimiter. Each of the data elements is evaluated to determine if it is a word or an expression element. The data elements represented as words (i.e., Carol, Deninger, 123, Apple, Lane, Boise, Idaho, and 99999) are extracted and tokenized. The data elements which are determined to match a regular expression pattern, are extracted and normalized. In this example case, normalizing the expression element includes removing any nonessential characters. The normalized expression element is then tokenized.

The following table represents the type of data, the example data element contents of record 802 corresponding to each type of data, and the tokens generated for each data element:

TABLE 1

| Type of Data | Data Element/ Normalized Data Element | Token (Numerical Representation of Data Element) |
| --- | --- | --- |
| First Name | Carol | 23 |
| Last Name | Deninger | 55 |
| Social Security Number | 000-00-0000/ 000000000 | 99 |
| Date of Birth | 1960-01-01/ 19600101 | 69 |
| Street Address 1 | 123 | 19 |
| Street Address 2 | Apple | 44 |
| Street Address 3 | Lane | 32 |
| City | Boise | 73 |
| State | ID | 29 |
| Zip Code | 99999 | 07 |

A tuple 812 of registration list 810 is created by registering record 802. Tokens 804 generated from record 802 may be stored in sequential order in tuple 812 of registration list 810. In one embodiment tuple 812 includes header information (not shown) including a document identifier identifying the delimited data file or associated data storage (e.g., Customer records database in Sales) associated with record 802. Also, an end of each tuple in registration list 810 can be defined by a termination entry such as a zero, as shown at the end of tuple 812. In addition, offsets 814 are provided with registration list 810, with each offset pointing to a separate token entry in registration list 810.

Index table 820 may be generated for registration list 810, with index 822 corresponding to tuple 812. Index 822 includes a token key (55), which is shown as the second occurring token in tuple 812. Token key (55) may be selected if it is the token of tuple 812 having the lowest frequency occurrence in the entire registration list 810, as previously described herein. In addition, offset (1001) is provided with token key (55) and points to the first occurring token (23) in tuple 812. Thus offset (1001) indicates the beginning of tuple 812. Index 822 may also include a docID or document identifier indicating the delimited data file or data storage associated with record 802.

Detection System

Figure 9:
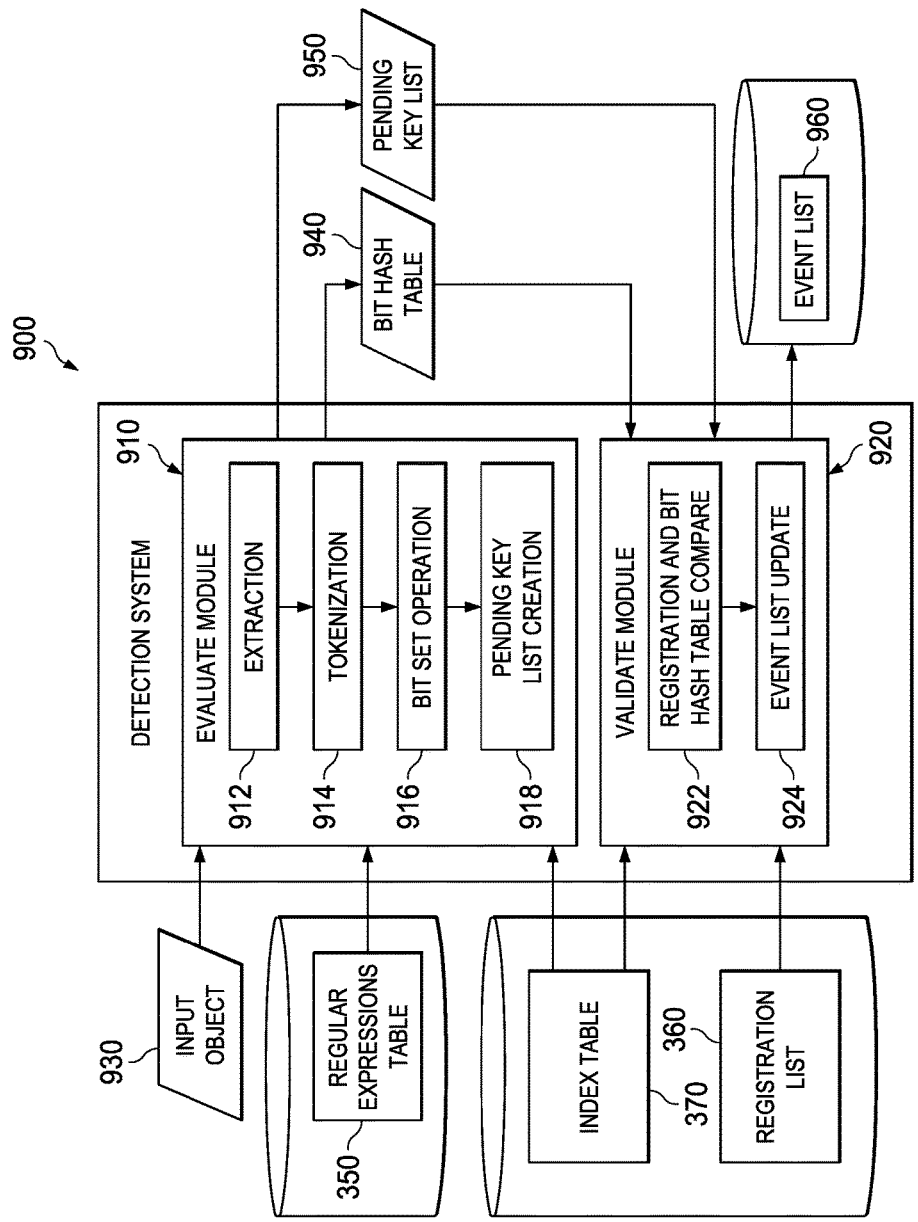
FIG. 9 is a block diagram of a detection system in the data combination protection system in accordance with one embodiment of the present disclosure.

Turning to FIG. 9, a simplified block diagram of one embodiment of a detection system 900 is shown. Detection system 900 can include an evaluate module 910 and a validate module 920. Input to evaluate module 910 can include an input object 930, regular expressions table 350, and index table 370. Output of evaluate module 910 can include a bit hash table 940 and a pending key list 950, both of which may be temporary. Evaluate module 910 may perform the functions of extraction 912, tokenization 914, bit set operation 916, and pending key list creation 918. Generally, evaluate module 910 processes a file, such as input object 930, to extract and tokenize each data element of the file in substantially the same manner that registration system 300 extracted and tokenized data elements of delimited data file 330. Thus, extracted and tokenized data elements from the file can be compared to the extracted and tokenized data elements from the delimited data file 330.

Input object 930 can include any type of data file or document to be analyzed to determine if any registered combination of data elements, or a predetermined threshold amount thereof, is present in the file or document. In one embodiment, input object 930 can be provided by capture system 29, as shown in FIG. 1, when packets are intercepted by capture system 29 in network 100 and the objects are reconstructed from the intercepted packets, as previously described herein and described in U.S. patent application Ser. No. 12/358,399, which has been previously incorporated herein by reference in its entirety. Example input objects include, but are not limited to, Microsoft Office documents (such as Word, Excel, PowerPoint, etc.), portable document format (PDF) files, text files, email messages, email attachments, any human language text document (e.g., Englishtext, Frenchtext, Germantext, Spanishtext, Japanesetext, Chinesetext, Koreantext, Russiantext, etc.), and the like. In addition to these various objects, a storage repository such as, for example, a database, may also be processed by detection system 900 to evaluate the contents for the presence of any registered data combinations. In one example embodiment, a common file, such as a CSV list, can be generated for a database or other file and provided to detection system 900 as input object 930.

Input object 930 can include words and/or expression elements separated by any number of separators and/or delimiters. In one embodiment, the contents of input object 930 can be sequentially processed. A character pattern of each data element of input object 930 can be compared to regular expressions table 350 to determine whether the data element matches a predefined expression pattern as previously described herein and as described in U.S. patent application Ser. No. 12/358,399, filed Jan. 23, 2009, entitled "SYSTEM AND METHOD FOR INTELLIGENT STATE MANAGEMENT," which has been previously incorporated herein by reference in its entirety. If the data element matches a predefined expression pattern, then the entire expression element can be extracted and normalized, such that tokenization function 914 can be performed on the normalized expression element. If the data element does not match a predefined expression pattern, then the data element is a word, which may be extracted and tokenized by tokenization function 914.

Bit set operation 916 and pending key list creation 918 may also be performed by evaluate module 910. Bit set operation 916 sets bits corresponding to each tokenized data element in bit hash table 940, thereby providing an efficient way of indicating each tokenized data element of input document 930. Pending key list creation 918 compares each tokenized data element of input object 930 to index table 370 to identify a corresponding token key in an index. In one embodiment, a corresponding token key is identified when the token key is equivalent to the tokenized data element (i.e., having the same numerical representation). If a corresponding token key is identified, then the tokenized data element or object token is saved to pending key list 950 for further analysis by validate module 920.

Validate module 920 of detection system 900 may perform the functions of registration list and bit hash table comparison 922 and event list update 924. Registration list and bit hash table comparison 922 can process pending keys (i.e., tokens) from pending key list 950 to find corresponding indexes in index table 370. In one embodiment, a pending key corresponds to a token key in an index when the pending key is equivalent to the token key (i.e., having the same numerical representation). The indexes can then be used to locate corresponding tuples in registration list 360. In one embodiment, the tokens in the identified tuples can be compared to bit hash table 940 to determine how many tokens in an identified tuple are present in input object 930. If it is determined that input object 930 contains data elements that, when tokenized, correspond to all of the tokens for a tuple, or correspond to a predetermined threshold amount thereof, then an event is validated. The use of bit hash table 940 to determine whether tokenized data elements of input object 930 correspond to tokens in a tuple will be further described herein with reference to FIGS. 10-13. Event list update 924 can update an event list 960, indicating the particular registered data combination that is found in input object 930, the document identifier associated with the particular registered data combination, and any other desired information (e.g., date and time stamp, source and/or destination addresses of network traffic, port numbers, etc.).

Figure 10:
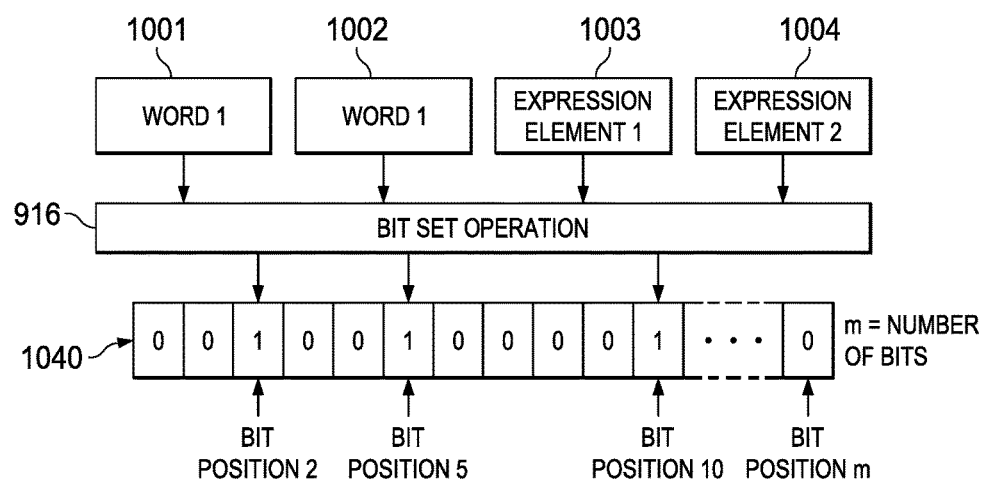
FIG. 10 is a simplified block diagram with example data input and output in accordance with one aspect of the detection system of the present disclosure.

Turning to FIG. 10, FIG. 10 is a simplified block diagram illustrating example data input and a resulting bit vector or bit hash table 1040, which may be generated by bit set operation 916 of evaluate module 910. Data element 1001 (word 1), data element 1002 (word 1), data element 1003 (expression element 1), and data element 1004 (expression element 2) represent example data elements of an input object, such as input object 930. Setting a bit position is done by changing a bit from "0" to "1" or from "1" to "0", depending on which value is the default. In one embodiment, all bits in bit hash table 1040 are initialized to "0" and a bit associated with a particular bit position in bit hash table 1040 can be set to a "1" if a data element corresponding to the same bit position is found in the input object.

In one example embodiment, bit set operation 916 can determine which data elements correspond to which bit positions of bit hash table 1040 by using a known prime number hashing technique. Bit hash table 1040 may include m bits, where m is equal to a prime number. When a modulo operation is performed on a token generated for one of the data elements 1001-1004, the result of the modulo operation can indicate the bit position corresponding to the data element represented by the token. Thus, the bit corresponding to the particular bit position can then be set to indicate the presence of the data element in the input object. In the example in FIG. 10, bit position 2 may correspond to data element 1001 (word 1) and data element 1002 (word 1), bit position 5 may correspond to data element 1003 (expression element 2), and bit position 10 may correspond to data element 1004 (expression element 1). Accordingly, each of the bits corresponding to bit positions 2, 5, and 10 may be set to a 1.

Figure 11:
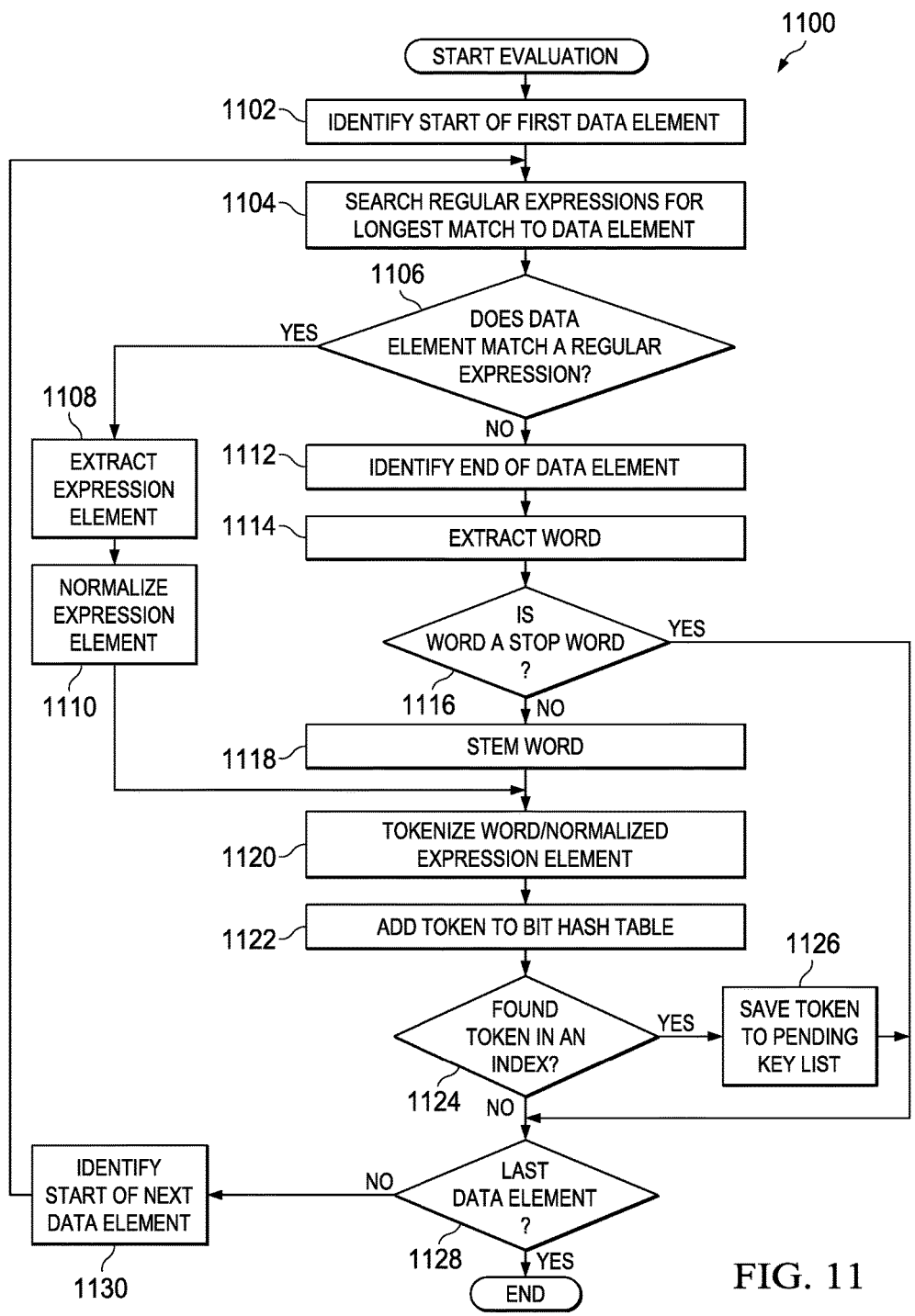
FIGS. 11-12 are simplified flowcharts illustrating a series of example steps associated with the detection system.
Figure 12:
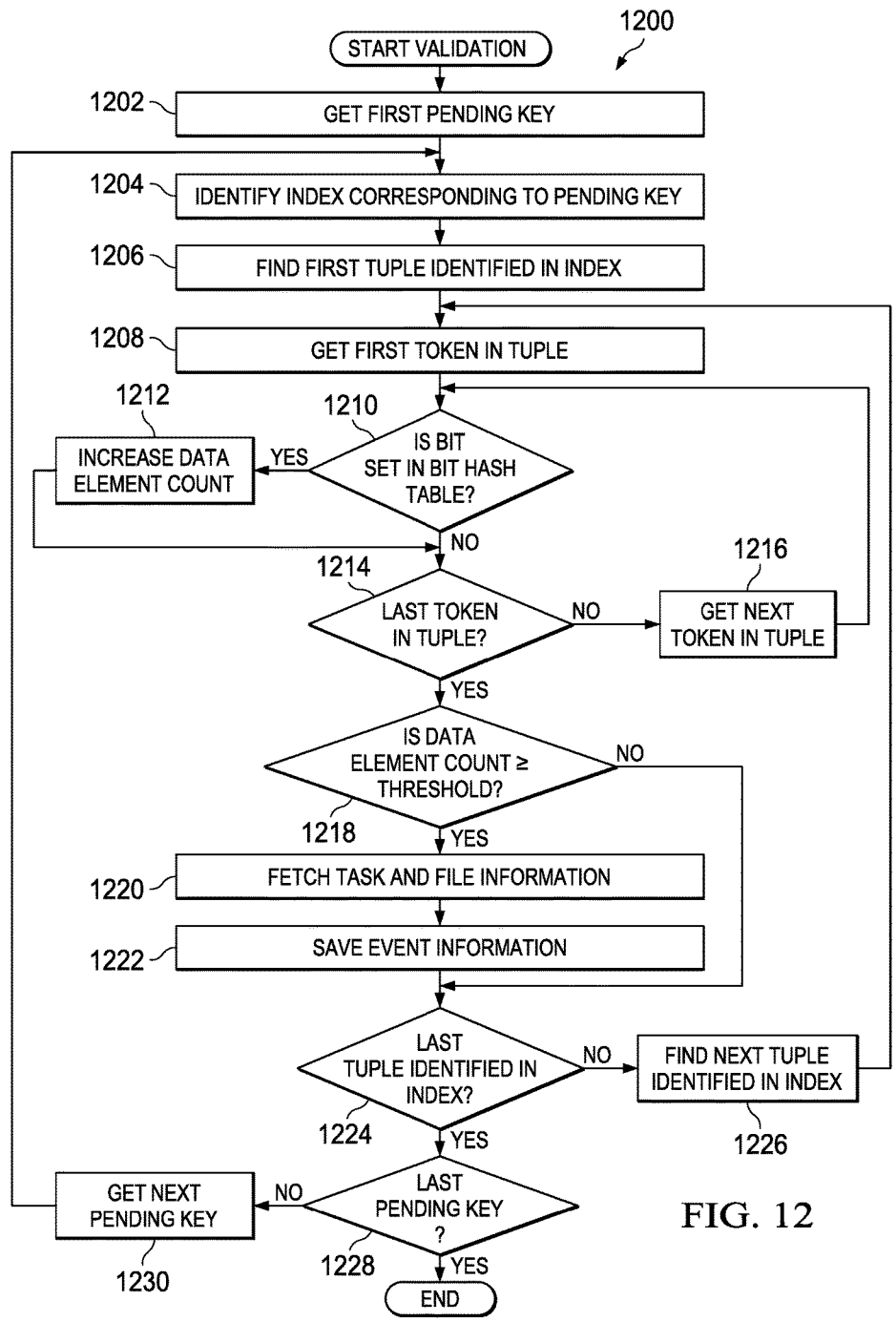

With reference to FIGS. 11 and 12, simplified flowcharts illustrate operational processing of detection system 900. FIG. 11 is a simplified flowchart illustrating example operational steps for evaluate module 910 of detection system 900 and FIG. 12 is a simplified flowchart illustrating example operational steps for validate module 920 of detection system 900.

Turning to FIG. 11, evaluation processing flow 1100 may include extraction and tokenization functions for input object 930 similar to the extraction and tokenization functions applied to delimited data files by registration list processing flow 600 of FIGS. 6A and 6B. Evaluation processing flow 1100 may begin in step 1102 where a start of a first data element in input object 930 is identified. In step 1104, regular expression table 350 is searched to find a longest match to a character pattern of a string of characters beginning at the start of the data element. In one embodiment, expression patterns from regular expression table 350 are compared in order of size from longest to shortest to determine if there is a match.

In decision box 1106 a query is made as to whether a match from the regular expression table 350 was found. If it is determined that none of the regular expression patterns match a character pattern of any string of characters beginning at the start of the data element (i.e., the data element does not match any regular expression patterns in regular expression table 350), then the data element represents a word and flow moves to step 1112 to find an end of the data element (i.e., the word), which can be extracted in step 1114. The end of the word is the last consecutive essential character beginning at the start of the data element. After the word has been extracted in step 1114, flow moves to decision box 1116, where the word may be evaluated to determine whether it is a 'stop word', as previously described herein. If the word is determined to be a stop word, then it is ignored and the flow proceeds to decision box 1128 to determine whether the current word is the last data element in input object 930. If the current word is the last data element, then processing ends. However, if the word is not the last data element in input object 930, then flow moves to step 1130 to find the start of the next data element. Flow then loops back to step 1104 to perform the extraction, tokenization, and storage of the new data element.

With reference again to decision box 1116, if the current word is determined not to be a stop word, then flow moves to step 1118 where the word may be stemmed. A stemming process such as, for example, a porter stemming algorithm, may be applied to the word in which any suffixes and/or affixes can be extracted off a stem of the word. After stemming has been performed if necessary, flow may pass to step 1120 where the word (or stemmed word) is tokenized. In one embodiment, tokenization includes converting the word (or stemmed word) into a 32-bit numerical representation or token, which is accomplished using the same technique used by registration list module 310 (e.g., Federal Information Processing Standards (FIPS) approved hash function).

After a token has been generated for the word in step 1120, a bit may be set in bit hash table 940 in step 1122. The set bit corresponds to a bit position in bit hash table 940 determined by performing a modulo operation on the token using the prime number size of the bit hash table, as previously described herein. The bit is set to indicate that the word, represented by the token, was found in input object 930. Some statistical collisions may occur in which tokens generated for two different data elements result in the same remainder. However, the system maintains statistical viability, at least in part because triggering an event requires a particular combination of data elements to be found in a document, rather than a single individual data element. In addition, collisions are typically infrequent when the table is sufficiently sized to a prime number.

After setting the proper bit in bit hash table 940, flow passes to decision box 1124 to determine whether the token corresponds to a token key in one of the indexes of index table 370. If the token corresponds to a token key in one of the indexes, then flow passes to step 1126 and the token is saved to pending key list 950. After the token is saved to pending key list 950, or if the token did not correspond to any token key of the indexes in index table 370, then flow passes to decision box 1128 to determine whether the data element corresponding to the current token is the last data element in input object 930. If the data element is not the last data element in input object 930, then flow passes to step 1130 where a start of the next data element is found. Flow then loops back to step 1104 to perform the extraction, tokenization, and storage of the new data element. With reference again to decision box 1128, if the data element is the last data element in input object 930, then the entire input object 930 has been processed and flow 1100 ends.

Referring back to decision box 1106, if it is determined that a match was found between an expression pattern of regular expression table 350 and a character pattern of a string of characters beginning at the start of the data element, then the data element represents an expression element and has the same length as the matching expression pattern. The expression element can be extracted in step 1108 and normalized in step 1110. In one embodiment, the particular type of normalizing employed by evaluate module 910 is the same type of normalizing employed in registration list module 310. As previously described herein, normalizing the expression element may include eliminating any separators from the expression element or modifying separators and/or particular essential characters of the expression element to achieve a predefined standard form for the expression element.

Once the expression element has been extracted and normalized, flow may move to step 1120 where the normalized expression element is tokenized. In step 1122, a bit may be set in bit hash table 940 corresponding to the value of a remainder resulting from a modulo operation on the token using the prime number size of the bit hash table, as previously described herein. After setting the proper bit in bit hash table 940, flow passes to decision box 1124 to determine whether the token corresponds to a token key in one of the indexes of index table 370. If the token corresponds to a token key in one of the indexes, then flow passes to step 1126 and the token is saved to pending key list 950. After the token is saved to pending key list 950, or if the token did not correspond to any token key in the indexes of index table 370, then flow passes to decision box 1128 to determine whether the data element corresponding to the current token is the last data element in input object 930. If the data element is not the last data element in input object 930, then flow passes to step 1130 where a start of the next data element is found. Flow then loops back to step 1104 to perform the extraction, tokenization, and storage of the new data element. With reference again to decision box 1128, if the data element is the last data element in input object 930, then the entire input object 930 has been processed and flow 1100 ends.

Turning to FIG. 12, FIG. 12 illustrates example operational steps in a validation processing flow 1200 of validate module 920 of detection system 900. Generally, validation processing flow 1200 uses bit hash table 940, pending key list 950, registration list 360, and index table 370 to determine whether a registered combination of data elements, or a predetermined threshold amount thereof, are contained in input object 930.

Flow may begin in step 1202 where a first pending key is retrieved from pending key list 950. Flow then moves to step 1204 where index table 370 is searched for an index with a token key corresponding to the pending key. Once an index is found, flow moves to step 1206 to find a first tuple identified in the index. The first tuple can be identified by using a first offset linked to the token key in the index. The offset may point to a location in the registration list of a token at the beginning of the corresponding tuple.

Once the first token of the corresponding tuple has been identified in registration list 360 in step 1208, operational steps 1210 through 1222 process the tuple until either an event is validated (i.e., all data elements or a threshold amount of data elements of a registered data combination are present in input object) or not validated (i.e., all data elements or a threshold amount of data elements of a registered data combination were not found in input object). In decision box 1210, a query is made as to whether a bit corresponding to the token is set in bit hash table 940. Thus, a modulo operation may be performed on the token using the prime number size of bit hash table 940 to determine which bit position to check in bit hash table 940. If the bit in the appropriate bit position is set, then flow may pass to step 1212 where a data element count can be incremented. The data element count indicates a total number of tokens, from the tuple being processed, that are found in bit hash table 940. After the data element count has been incremented, or if the bit was not set in bit hash table 940, then flow passes to decision box 1214 to determine whether the current token is the last token in the tuple. If the current token is not the last token in the tuple, then flow passes to step 1216 to identify the next token in the tuple. Flow then loops back to decision box 1210 to determine whether a bit corresponding to the new token is set.

Once every token in the tuple has been processed, in decision box 1214 it is determined that the last token in the tuple has been evaluated. Flow may then pass to decision box 1218 where a query is made as to whether the data element count is greater than or equal to a predetermined threshold amount. In one embodiment, an event may be validated when all data elements from a single record of a delimited data file are found in an input document. Thus, in this embodiment, the predetermined threshold amount would equal the number of data elements in the record (i.e., the number of tokens in the corresponding tuple). However, other embodiments may use a certain percentage (e.g., 50%, 75%, etc.) or particular minimum number (e.g., 2, 3, 4, etc.) of the total number of data elements from a single record. Administratively, data protection manager 32 shown in FIG. 1 may be configured to allow an authorized user to set the predetermined threshold amount as desired.

If the data element count meets or exceeds the predetermined threshold amount in step 1218, then an event is validated and the flow passes to step 1220 where task and file information are retrieved. In one example embodiment, file information may be retrieved from the document ID (docID) corresponding to the particular offset in the index used to locate the current tuple. In addition, other information related to input object 930 (e.g., transmission information such as source and destination addresses, source and address ports, date and time, email addresses of an associated email message, file path of document, database, or other storage repository, etc.) may be obtained in order to correctly identify the particular object containing registered data combinations. In addition, the particular data elements of the registered combination of data elements found in input object 930 may be stored and/or displayed for an authorized user to review.

Once all of the desired information for a validated event has been retrieved, flow passes to step 1222 in which the event may be recorded in event list 960 and/or appropriate notifications (e.g., email notification, Syslog notification, status messages, etc.) may be provided to an authorized user including some or all of the retrieved information. The validation of an event can also trigger actions to prevent the transmission of an object that triggered the event validation or to lock down a database or other storage repository that triggered the event validation. Such enforcement actions can be implemented via capture system 29 or other existing infrastructure designed to stop the flow of data transmissions.

With reference again to decision box 1218, if the data element count does not meet the predetermined threshold, then no event is validated and steps 1220 and 1222 are bypassed. After all of the tokens of the current tuple have been processed and either an event has been validated or no event has been validated, then flow passes to decision box 1224 where a determination is made as to whether the tuple being processed is the last tuple identified in the index. If the current tuple is not the last tuple in the index, then the subsequent <NEXT> pointer in the index indicates the next tuple to be processed by designating an offset for the next tuple in registration list 360. Thus, if the index has a <NEXT> pointer that is not null, then flow passes to step 1226 and the next tuple is identified by the offset linked to the <NEXT> pointer. Flow then loops back to step 1208 to begin processing tokens of the next tuple to determine whether to validate an event for the next tuple.

With reference again to decision box 1224, if the current tuple is determined to be the last tuple in the index, then flow passes to decision box 1228 to determine whether the pending key is the last pending key in pending key list 950. If the current pending key is not the last one in pending key list 950, then the next pending key is retrieved from pending key list 950 in step 1230 and flow loops back to step 1204, where index table 370 is searched for a token key that corresponds to the new pending key. Flow then continues processing to determine whether to validate an event for each tuple indicated by the particular index of index table 370.

With reference again to decision box 1228, if the current pending key is the last pending key in pending key list 950, then all of the pending keys identified in input object 930 have been processed and events have been validated for corresponding tuples, if appropriate. Not shown in FIG. 12, however, are additional steps that may be performed after all of the pending keys have been processed to prepare memory allocations for subsequent detection system processing. For example, all bits in bit hash table 940 may be set to the default value (e.g., "0"), and a pointer of pending key list 950 may be reset to the beginning of the list.

Figure 13:
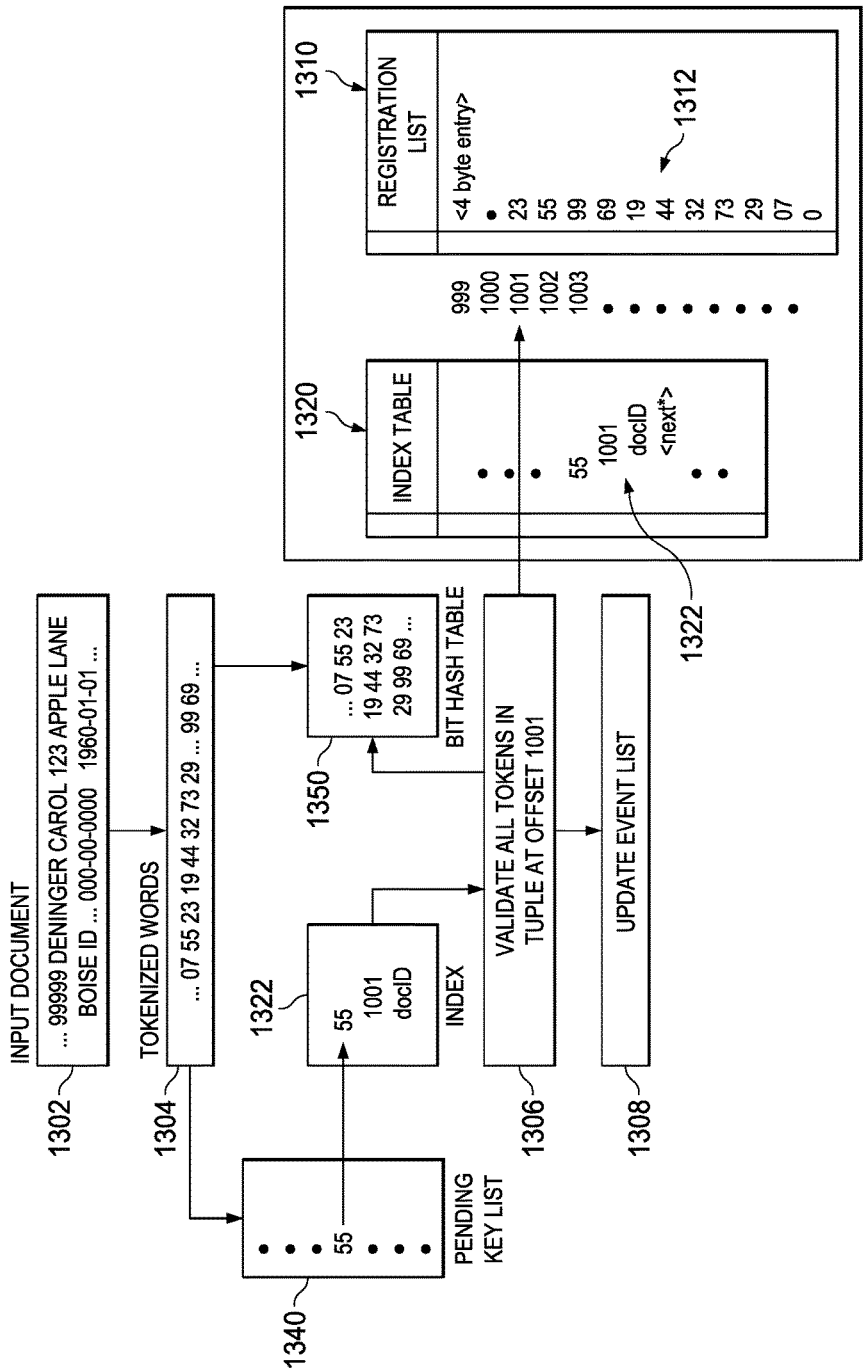
FIG. 13 illustrates file contents in an example scenario associated with the detection system processing in accordance with one embodiment of the present disclosure.

Turning to FIG. 13, FIG. 13 illustrates a scenario in which an example input document 1302 is processed by detection system 300. A representative sample of data elements is shown in input document 1302, with ellipses indicating additional data elements not shown. In addition, a registration list 1310 and an index table 1320 are shown already created from registration system 300. Tokenized words 1304 show the object tokens generated for each of the data elements shown in input document 1302. During evaluation processing of detection system 300, a bit is set for each of the object tokens shown in bit hash table 1350. In addition, for each object token, index table 1320 is searched for a token key in an index corresponding to the object token. In the example data of FIG. 13, object token (55) is found in an index having a token key (55) and, therefore, object token (55) is stored in a pending key list 1340.

After bit hash table 1350 and pending key list 1340 have been generated, each of the pending keys in pending key list 1340 is processed to determine if a corresponding tuple of tokens, or a predetermined threshold amount of tokens in the corresponding tuple, are represented in bit hash table 1350. In the example scenario of FIG. 13, index table 1320 is searched for an index with a token key corresponding to pending key (55). Index 1322, having token key (55), is found and validation processing is performed as indicated at box 1306. The offset 1001 of index 1322 is used to identify tuple 1312. Each of the tokens in tuple 1312 is analyzed to determine if a corresponding bit is set in bit hash table 1350. In this case, all of the tokens of tuple 1312 are represented by a bit set in bit hash table 1350. Therefore, the predetermined threshold is met, an event is validated, and an event list may be updated as indicated in box 1308. Thus, in this example, detection system 300 determines that input document 1302 contains a threshold amount of a registered combination of data elements (i.e., data elements represented by tuple 1312) and, consequently, validates an event.

While the above described processing flows illustrate an example embodiment, alternatively, other processing flows may be implemented. For example, instead of sequentially processing each data element of a record in delimited data file 330, or sequentially processing each data element of input object 930, a parser may be used as described in U.S. patent application Ser. No. 12/358,399, which was previously incorporated herein by reference. In such an embodiment, a parser can parse extracted data to identify all of the expression elements within the particular record or object. Expression elements can be identified by parsing expression patterns from regular expressions table 350 over the record or object. In one embodiment, expression patterns are parsed over the record or object in descending order from longest to shortest. Once all of the expression elements are identified, then each word could be extracted from the remaining data in the record or object.

Software for achieving the registration and detection operations outlined herein can be provided at various locations (e.g., the corporate IT headquarters, network appliances distributed to egress points of a network, etc.). In other embodiments, this software could be received or downloaded from a web server (e.g., in the context of purchasing individual end-user licenses for separate networks, devices, servers, etc.) in order to provide this system for protecting specified combinations of data. In one example implementation, this software is resident in one or more computers sought to be protected from a security attack (or protected from unwanted or unauthorized manipulations of data).

In various examples, the software of the system for protecting specified data combinations in a computer network environment could involve a proprietary element (e.g., as part of a network security solution with McAfee® Network Data Loss Prevention (NDLP) software, McAfee® ePolicy Orchestrator (ePO) software, etc.), which could be provided in (or be proximate to) these identified elements, or be provided in any other device, server, network appliance, console, firewall, switch, information technology (IT) device, distributed server, etc., or be provided as a complementary solution (e.g., in conjunction with a firewall), or provisioned somewhere in the network.

In certain example implementations, the registration and detection activities outlined herein may be implemented in software. This could be inclusive of software provided in network appliances 12, 14, 16, 18, and 30 (e.g., registration system 22, detection systems 24, 26, and 28, and capture system 29). These elements and/or modules can cooperate with each other in order to perform registration and detection activities as discussed herein. In other embodiments, these features may be provided external to these elements, included in other devices to achieve these intended functionalities, or consolidated in any appropriate manner. For example, some of the processors associated with the various elements may be removed, or otherwise consolidated such that a single processor and a single memory location are responsible for certain activities. In a general sense, the arrangement depicted in FIG. 1 may be more logical in its representation, whereas a physical architecture may include various permutations, combinations, and/or hybrids of these elements.

In various embodiments, all of these elements (e.g., network appliances 12, 14, 16, 18, and 30) include software (or reciprocating software) that can coordinate, manage, or otherwise cooperate in order to achieve the registration and detection operations, as outlined herein. One or all of these elements may include any suitable algorithms, hardware, software, components, modules, interfaces, or objects that facilitate the operations thereof. In the implementation involving software, such a configuration may be inclusive of logic encoded in one or more tangible media (e.g., embedded logic provided in an application specific integrated circuit (ASIC), digital signal processor (DSP) instructions, software (potentially inclusive of object code and source code) to be executed by a processor, or other similar machine, etc.), which may be inclusive of non-transitory media.

In some of these instances, one or more memory elements (e.g., main memory 230, secondary storage 240, etc.) can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor (as shown in FIG. 2) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other type of machine-readable medium suitable for storing electronic instructions, or any suitable combination thereof.

In various embodiments, the registration and detection systems 22, 24, 26, and 28 have been described above as systems implemented in stand-alone devices, such as network appliances 12, 14, 16, and 18. In one embodiment, the registration and detection systems 22, 24, 26, and 28 can be implemented in an appliance constructed using commonly available computing equipment and storage systems capable of supporting the software requirements. However, the registration and detection systems could alternatively be implemented on any computer capable of intercepting and accessing data from a network. For example, registration system 22 could be implemented on a server of network 100 shown in FIG. 1. In another example, detection systems 14, 16, and 18 could be implemented on their respective gateways and routers/switches.

Any of the memory items discussed herein should be construed as being encompassed within the broad term 'memory element.' Similarly, any of the potential processing elements, modules, and machines described in this Specification should be construed as being encompassed within the broad term 'processor.' Each of the computers may also include suitable interfaces for receiving, transmitting, and/or otherwise communicating data or information in a network environment.

Note that with the numerous examples provided herein, interaction may be described in terms of two, three, four, or more network elements. However, this has been done for purposes of clarity and example only. It should be appreciated that the system can be consolidated in any suitable manner. Along similar design alternatives, any of the illustrated computers, modules, components, and elements of FIG. 1 may be combined in various possible configurations, all of which are clearly within the broad scope of this Specification. In certain cases, it may be easier to describe one or more of the functionalities of a given set of flows by only referencing a limited number of network elements. It should be appreciated that the system of FIG. 1 (and its teachings) is readily scalable and can accommodate a large number of components, as well as more complicated/sophisticated arrangements and configurations. Accordingly, the examples provided should not limit the scope or inhibit the broad teachings of data combination protection system 10 as potentially applied to a myriad of other architectures.

It is also important to note that the operations described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

What is claimed is:

1. At least one non-transitory, computer readable medium comprising instructions that, when executed, cause one or more processors to:
   tokenize a plurality of data elements in an object into a plurality of object tokens;
   identify, in an index table of token keys, a token key that corresponds to an object token of the plurality of object tokens;
   identify a first tuple of a plurality of tuples in a registration list based, at least in part, on the token key, wherein the first tuple includes a set of registered tokens that represents a set of data elements, and the token key is a registered token in the set of registered tokens;
   determine a number of the registered tokens that are found in at least one object token of the plurality of object tokens; and
   take an action based on determining that the number of the registered tokens satisfies a predetermined threshold associated with the set of data elements, wherein the action is preventing transmission of the object or locking down a storage repository.

2. The at least one computer readable medium of claim 1, wherein the instructions, when executed by the at least one processor:
   create a pending key list based on each token key in the index table that corresponds to one or more object tokens of the plurality of object tokens.

3. The at least one computer readable medium of claim 2, wherein the identifying the first tuple includes:
   selecting a pending key from the pending key list;
   identifying the token key in the index table based on the selected pending key; and
   using an offset associated with the token key in the index table to identify the first tuple, wherein the offset indicates a location of the first tuple in the registration list.

4. The at least one computer readable medium of claim 1, wherein the registered token occurs with less frequency across the plurality of tuples in the registration list than frequencies at which other registered tokens of the first tuple occur across the plurality of tuples in the registration list.

5. The at least one computer readable medium of claim 1, wherein the predetermined threshold is satisfied based on each registered token in the set of registered tokens being found in at least one of the plurality of object tokens.

6. The at least one computer readable medium of claim 1, wherein the instructions, when executed by the at least one processor:
represent the plurality of object tokens in a bit hash table by setting a respective bit in the bit hash table for unique object tokens of the plurality of object tokens.

7. The at least one computer readable medium of claim 6, wherein determining the number of the registered tokens includes determining, for each registered token of the set of registered tokens, whether a bit is set in a bit position of the bit hash table that corresponds to that registered token.

8. The at least one computer readable medium of claim 1, wherein the data elements of the plurality of data elements are tokenized by converting each data element to a respective hash value.

9. The at least one computer readable medium of claim 1, wherein the object is intercepted in network traffic sent out of a network.

10. The at least one computer readable medium of claim 1, wherein the index table includes a plurality of indexes, each index including a unique token key and an offset to a location in the registration list.

11. The at least one computer readable medium of claim 1, wherein the instructions, when executed by the at least one processor:
prior to tokenizing a data element of the data elements in the object, identify the data element in the object and extract the data element from the object.

12. The at least one computer readable medium of claim 1, wherein, if two or more tuples are indexed by the token key, an index is to include two or more unique offsets indicating respective locations of the two or more tuples, each of the two or more tuples is to include a respective set of data file tokens, and each of the respective sets of data file tokens is to include the token key.

13. An apparatus, comprising:
a memory device including a set of instructions; and
a processor, coupled to the memory device, that, when executing the set of instructions, is to
tokenize a plurality of data elements in an object into a plurality of object tokens;
identify, in an index table of token keys, a token key that corresponds to an object token of the plurality of object tokens;
identify a tuple of a plurality of tuples in a registration list based, at least in part, on the token key, wherein the tuple includes a set of registered tokens that represents a set of data elements, and the token key is a registered token in the set of registered tokens;
determine a number of the registered tokens that are found in at least one object token of the plurality of object tokens; and
take an action based on determining that the number of the registered tokens satisfies a predetermined threshold associated with the set of data elements, wherein the action is preventing transmission of the object or locking down a storage repository.

14. The apparatus of claim 13, wherein the processor, when executing the set of instructions, is to:
create a pending key list based on each token key in the index table that corresponds to one or more object tokens of the plurality of object tokens.

15. The apparatus of claim 14, wherein identifying the first tuple includes:
selecting a pending key from the pending key list;
identifying the token key in the index table based on the selected pending key; and
using an offset associated with the token key in the index table to identify the tuple, wherein the offset indicates a location of the tuple in the registration list.

16. The apparatus of claim 13, wherein the registered token occurs with less frequency across the plurality of tuples in the registration list than frequencies at which other registered tokens of the tuple occur across the plurality of tuples in the registration list.

17. The apparatus of claim 13, wherein the data elements of the plurality of data elements are tokenized by converting each data element to a respective hash value.

18. A method, the method comprising:
tokenizing a plurality of data elements in an object into a plurality of object tokens;
identifying, in an index table of token keys, a token key that corresponds to an object token of the plurality of object tokens;
identifying a tuple of a plurality of tuples in a registration list based, at least in part, on the token key, wherein the tuple includes a set of registered tokens that represents a set of data elements, and the token key is a registered token in the set of registered tokens;
determining a number of the registered tokens that are found in at least one object token of the plurality of object tokens; and
taking an action based on determining that the number of the registered tokens satisfies a predetermined threshold associated with the set of data elements, wherein the action is preventing transmission of the object or locking down a storage repository.

19. The method of claim 18, wherein the registered token occurs with less frequency across the plurality of tuples in the registration list than frequencies at which other registered tokens of the tuple occur across the plurality of tuples in the registration list.

20. The method of claim 18, wherein the index table includes a plurality of indexes, each index including a unique token key and an offset to a location in the registration list.

* * * * *